United States Patent
Marks et al.

(10) Patent No.: US 11,998,852 B2
(45) Date of Patent: Jun. 4, 2024

(54) MULTI-PLAYER GAMING SYSTEM WITH SYNCHRONIZATION PERIODS AND ASSOCIATED SYNCHRONIZATION METHODS

(71) Applicant: Aristocrat Technologies, Inc. (ATI), Las Vegas, NV (US)

(72) Inventors: Daniel Marks, Decatur, GA (US); Hua Xu, Marietta, GA (US); Dinesh Dua, Alpharetta, GA (US)

(73) Assignee: ARISTOCRAT TECHNOLOGIES, INC., Las Vegas, NV (US)

( * ) Notice: Subject to any disclaimer, the term of this patent is extended or adjusted under 35 U.S.C. 154(b) by 0 days.

(21) Appl. No.: 17/877,147

(22) Filed: Jul. 29, 2022

(65) Prior Publication Data

US 2024/0033649 A1    Feb. 1, 2024

(51) Int. Cl.
G07F 17/32    (2006.01)
A63F 13/52    (2014.01)
A63F 13/847    (2014.01)

(52) U.S. Cl.
CPC ............ *A63F 13/847* (2014.09); *A63F 13/52* (2014.09)

(58) Field of Classification Search
CPC ........................................................ G07F 17/32
See application file for complete search history.

(56) References Cited

U.S. PATENT DOCUMENTS

| | | |
|---|---|---|
| 4,805,907 A | 2/1989 | Hagiwara |
| 5,688,174 A | 11/1997 | Kennedy |
| 6,071,195 A | 6/2000 | Krude |
| 6,089,980 A | 7/2000 | Gauselmann |
| 6,855,054 B2 | 2/2005 | White |
| 7,004,466 B2 | 2/2006 | Gauselmann |
| 7,029,395 B1 | 4/2006 | Baerlocher |
| 7,377,514 B1 | 5/2008 | Timpano |

(Continued)

FOREIGN PATENT DOCUMENTS

| | | |
|---|---|---|
| AU | 2013231108 | 5/2014 |
| GB | 1196190 A | 6/1970 |

(Continued)

OTHER PUBLICATIONS

Australian Examination Report for AU2015207941, dated May 13, 2016, 6 pages.

(Continued)

*Primary Examiner* — Omkar A Deodhar
(74) *Attorney, Agent, or Firm* — McAndrews, Held & Malloy, Ltd.

(57) ABSTRACT

Multi-player games in which players cooperate and/or compete with one another over the course of several rounds of the game are disclosed. A controller may synchronize gaming devices used by the players during the multi-player games. The controller may send sync commands to the gaming devices. In response to the sync commands, the gaming devices may start a sync timer which defines a window in which certain guarded operations may be accepted by the gaming devices. The controller may send periodic sync update commands to the gaming devices which cause the gaming devices to update their respect sync timers to a time remaining of a master sync timer or window maintained by the controller. The controller may ensure that play of the multi-player game proceeds in a relatively lock-step manner across the gaming devices.

20 Claims, 13 Drawing Sheets

(56) References Cited

U.S. PATENT DOCUMENTS

| | | |
|---|---|---|
| 7,704,141 B1 | 4/2010 | Marks |
| 8,235,792 B2 | 8/2012 | Kelly |
| 8,298,066 B2 | 10/2012 | Kelly |
| 8,360,864 B2 | 1/2013 | Dickerson |
| 8,529,345 B2 | 9/2013 | Nguyen |
| 9,412,235 B2 | 8/2016 | Kup-Ferroth |
| 2003/0036430 A1 | 2/2003 | Cannon |
| 2003/0104853 A1 | 6/2003 | Tessmer |
| 2003/0119576 A1 | 6/2003 | McClintic |
| 2003/0148804 A1 | 8/2003 | Tomonobu |
| 2003/0153385 A1 | 8/2003 | Tomonobu |
| 2003/0199308 A1 | 10/2003 | Parker |
| 2003/0224852 A1 | 12/2003 | Walker |
| 2004/0092300 A1 | 5/2004 | Gauselmann |
| 2004/0242297 A1 | 12/2004 | Walker |
| 2005/0003881 A1 | 1/2005 | Byng |
| 2005/0026674 A1 | 2/2005 | Wolf |
| 2006/0009283 A1 | 1/2006 | Englman |
| 2006/0046823 A1 | 3/2006 | Kaminkow |
| 2006/0073897 A1 | 4/2006 | Englman |
| 2006/0290055 A1 | 12/2006 | Matilla |
| 2007/0060314 A1 | 3/2007 | Baerlocher |
| 2007/0082725 A1 | 4/2007 | Low |
| 2007/0232384 A1 | 10/2007 | Pace |
| 2007/0232385 A1 | 10/2007 | Pace |
| 2008/0020817 A1 | 1/2008 | Kaminkow |
| 2008/0026824 A1 | 1/2008 | Muir |
| 2008/0045287 A1 | 2/2008 | Amirsadri |
| 2008/0051168 A1 | 2/2008 | Kaminkow |
| 2008/0064492 A1 | 3/2008 | Oosthoek |
| 2008/0070702 A1 | 3/2008 | Kaminkow |
| 2008/0096656 A1 | 4/2008 | LeMay |
| 2008/0108423 A1 | 5/2008 | Benbrahim |
| 2008/0199834 A1 | 8/2008 | Taillefer |
| 2008/0214267 A1 | 9/2008 | Ghaly |
| 2008/0274786 A1 | 11/2008 | Wilson |
| 2009/0088238 A1 | 4/2009 | Moody |
| 2009/0124345 A1 | 5/2009 | Gilmore |
| 2009/0124371 A1 | 5/2009 | Gilmore |
| 2009/0124385 A1 | 5/2009 | Cuddy |
| 2009/0131145 A1 | 5/2009 | Aoki |
| 2009/0239632 A1 | 9/2009 | Leupp |
| 2009/0270165 A1 | 10/2009 | Dias Pires |
| 2009/0325673 A1 | 12/2009 | Kelly |
| 2010/0022307 A1 | 1/2010 | Steuer |
| 2010/0190543 A1 | 7/2010 | Englman |
| 2010/0285886 A1 | 11/2010 | Kup-Ferroth |
| 2011/0009187 A1 | 1/2011 | Mastropietro |
| 2011/0117987 A1 | 5/2011 | Aoki |
| 2012/0021816 A1 | 1/2012 | Aoki |
| 2013/0137497 A1 | 5/2013 | Werkstell |
| 2013/0310159 A1 | 11/2013 | Froy |
| 2014/0051492 A1 | 2/2014 | Koh |
| 2014/0357342 A1 | 12/2014 | Elias |
| 2015/0099575 A1 | 4/2015 | Elias |
| 2016/0379451 A1 | 12/2016 | Kup-Ferroth |

FOREIGN PATENT DOCUMENTS

| | | |
|---|---|---|
| JP | 7294656 A | 10/1995 |
| JP | 4336087 A | 4/2004 |
| JP | 2006198438 A | 8/2006 |
| JP | 2006198439 A | 8/2006 |
| JP | 2006198440 A | 8/2006 |
| JP | 2008067731 A | 3/2008 |
| KR | 20020064606 A | 8/2002 |
| RU | 2281031 C2 | 8/2006 |
| WO | 9701840 A1 | 1/1997 |
| WO | 0005996 A1 | 2/2000 |
| WO | 2008080071 A1 | 7/2008 |
| WO | 2008104834 A2 | 9/2008 |
| WO | 2008108193 A1 | 9/2008 |
| WO | 2008128898 A1 | 10/2008 |
| WO | 2008137878 A2 | 11/2008 |

OTHER PUBLICATIONS

Australian Examination Report for AU2017203174, dated Feb. 7, 2018, 4 pages.

International Search Report and Written Opinion corresponding to International Patent Application No. PCT/IB2015/001902, dated May 17, 2016.

Notification Concerning Transmittal of International Preliminary Report on Patentability dated Feb. 16, 2017 with International Preliminary Report on Patentability corresponding to International Patent Application No. PCT/IB2015/001902.

Australian Examination Report for AU2019200844, dated Dec. 17, 2019, 4 pages.

Office Action dated Jun. 25, 2020 for U.S. Appl. No. 16/245,950 (pp. 1-6).

Office Action dated Dec. 23, 2020 for U.S. Appl. No. 16/245,950 (pp. 1-7).

Office Action dated Apr. 1, 2021 for U.S. Appl. No. 16/245,950 (pp. 1-6).

Office Action (Non-Final Rejection) dated Oct. 28, 2021 for U.S. Appl. No. 16/245,950 (pp. 1-6).

Office Action (Final Rejection) dated Mar. 31, 2022 for U.S. Appl. No. 16/245,950 (pp. 1-7).

MULTI-PLAYER GAMING SYSTEM WITH SYNCHRONIZATION PERIODS AND ASSOCIATED SYNCHRONIZATION METHODS

FIELD OF THE INVENTION

The present invention relates to a gaming system, a method of gaming and a controller.

BACKGROUND OF THE INVENTION

There exist multi-player games that allow participation by multiple players where one player will be the winner of the multi-player game. Multi-player games are usually played over gaming systems comprising networks of gaming machines that are independently playable of one another. That is, each gaming machine may be operable to play both a single-player game and a multi-player game, and a player may be awarded prizes from the single-player game and the multi-player game.

While such gaming systems provide players with enjoyment, a need exists for alternative gaming systems in order to maintain or increase player enjoyment.

SUMMARY OF THE INVENTION

Aspects of the present disclosure involve synchronization of gaming devices executing multi-player games in which players cooperate and/or compete with one another over the course of several rounds of the game. To ensure fairness in play, a controller may synchronize the gaming devices used by the players during the multi-player games. To this end, the controller may send sync commands to the gaming devices. In response to the sync commands, the gaming devices may start a sync timer which defines a window in which certain guarded operations (e.g., placing bets, making game-related selections, etc.) may be accepted by the gaming devices. Moreover, the controller may send periodic sync update commands to the gaming devices which cause the gaming devices to update their respect sync timers to a time remaining of a master sync timer or window maintained by the controller. In this manner, the controller may ensure that play of the multi-player game proceeds in a relatively lock-step manner across the gaming devices to prevent players from gaining an advantage from observing selections and/or game results of other players before making their respective selections.

In a first aspect, the invention provides a gaming system comprising:
  a plurality of gaming devices each operable to participate in a multi-player game; and
  a controller in communication with each gaming device, and arranged to generate one or more multi-player game events in respect of the multi-player game, wherein:
  the gaming system is arranged to:
    receive for each multi-player game event, a player input from each gaming device participating in the multi-player game;
    generate for each multi-player game event, a modified multi-player game event for each participating gaming device;
    evaluate the modified multi-player game events to identify at least one winning multi-player gaming device; and
    make an award in respect of the at least one winning multi-player gaming device.

In an embodiment, each modified multi-player game event is generated by the controller.

In an embodiment, the modified multi-player game events are generated by respective ones of the participating gaming devices.

In an embodiment, the gaming system evaluates the modified multi-player game events by evaluating for each multi-player game event, the modified multi-player game event for each participating gaming device to identify at least one winning multi-player gaming device for the multi-player game event.

In an embodiment, each modified multi-player game event is evaluated by the controller.

In an embodiment, each modified multi-player game event is evaluated by the gaming device for which the modified multi-player game event is generated.

In an embodiment, the gaming system evaluates the modified multi-player game events by:
  evaluating for each multi-player game event, the modified multi-player game event for each participating gaming device to determine a multi-player game outcome; and
  evaluating the multi-player game outcomes for all of the multi-player game events to identify the at least one winning multi-player gaming device.

In an embodiment, each multi-player game outcome is a score, and wherein the at least one winning multi-player gaming device is the participating gaming device or devices that have the highest scores.

In an embodiment, the modified multi-player game events are evaluated by the controller.

In an embodiment, the multi-player game is a spinning reel type game, and wherein the gaming system generates each multi-player game event by selecting a plurality of sets of symbols for display at respective display positions.

In an embodiment, the gaming system generates for each multi-player game event, the modified multi-player game event for each participating gaming device by generating a plurality of modified sets of symbols based on the player input received by the participating gaming device.

In an embodiment, for each multi-player game event, the player input from each participating gaming device is a selection of one or more of the display positions.

In an embodiment, the gaming system generates for each multi-player game event, the plurality of modified sets of symbols for each participating gaming device by modifying the selected symbols for display at the selection of the one or more display positions.

In an embodiment, the gaming system modifies the selected symbols to respective function symbols.

In an embodiment, each function symbol is a WILD symbol.

In an embodiment, each function symbol is a multiplier.

In an embodiment, the controller is arranged to evaluate the player input from each gaming device to determine whether or not the gaming device is eligible to participate in the multi-player game.

In an embodiment, the controller is arranged to monitor a trigger device to determine whether or not a trigger condition is met.

In an embodiment, the trigger device is a user interface, and wherein the trigger condition is that the user interface receives an input.

In an embodiment, the trigger device is a random number generator, and the trigger condition is that the random number generator generates one of one or more predetermined numbers.

In a second aspect, the invention provides a controller in communication with a plurality of gaming devices each operable to participate in a multi-player game, comprising
- an event generator arranged to generate one or more multi-player game events in respect of the multi-player game; and
- a prize awarder arranged to make an award in respect of at least one winning multi-player gaming device, the at least one winning multi-player gaming device being identified by evaluating one or more modified multi-player game events for each multi-player game event.

In a third aspect, the invention provides an electronic method of gaming comprising a gaming system:
- generating one or more multi-player game events in respect of the multi-player game in which each one of a plurality of gaming devices in communication with the electronic controller is operable to participate;
- receiving for each multi-player game event, a player input from each gaming device participating in the multi-player game;
- generating for each multi-player game event, a modified multi-player game event for each participating gaming device;
- evaluating the modified multi-player game events to identify at least one winning multi-player gaming device; and
- making an award in respect of the at least one winning multi-player gaming device.

In a fourth aspect, the invention provides a gaming system comprising:
- a plurality of gaming devices each operable to participate in a multi-player game; and
- a controller in communication with each gaming device, and arranged to generate a multi-player game event in respect of the multi-player game, wherein:
  - the gaming system is arranged to evaluate the multi-player game event to determine whether or not the generated multi-player game event corresponds to a winning multi-player game event; and
  - the controller is arranged to make an award in respect of each of the gaming device or devices participating in the multi-player game, upon a determination that the generated multi-player game event corresponds to the winning multi-player game event.

In an embodiment, the multi-player game event is evaluated by the controller.

In an embodiment, the multi-player game event is evaluated by each gaming device.

In an embodiment, the multi-player game is a spinning reel type game and the winning multi-player game event is a winning symbol combination.

In an embodiment, the controller generates the multi-player game event by selecting a plurality of sets of symbols, and the gaming system evaluates the multi-player game event by evaluating the selected symbols to determine whether or not the selected symbols include the winning symbol combination.

In an embodiment, each gaming device is arranged to receive a player input to participate in the multi-player game, and the controller is arranged to evaluate the player input received from each gaming device to determine whether or not the gaming device is eligible to participate in the multi-player game based on the player input.

In an embodiment, each gaming device comprises a display, and the controller is arranged to communicate the award to each gaming device for display on the display of the gaming device.

In an embodiment, the controller is arranged to communicate the multi-player game event to each gaming device for display on the display of the gaming device.

In an embodiment, the gaming system further comprises a plurality of multi-player game displays in communication with the controller, and wherein the controller is arranged to communicate with each multi-player game display.

In an embodiment, at least one of the gaming devices is located at a location different from the other gaming device or devices.

In a fifth aspect, the invention provides a controller in communication with a plurality of gaming devices each operable to participate in a multi-player game having a winning multi-player game event, comprising:
- an event generator arranged to generate a multi-player game event in respect of the multi-player game; and
- a prize awarder arranged to make an award in respect of each of the gaming device or devices participating in the multi-player game, upon an evaluation of the generated multi-player game event by an event evaluator that determines that the generated multi-player game event corresponds to a winning multi-player game event.

In a sixth aspect, the invention provides an electronic method of gaming comprising a gaming system:
- generating a multi-player game event in respect of a multi-player game in which each one of a plurality of gaming devices in communication with the electronic controller is operable to participate, the multi-player game having a winning multi-player game event;
- evaluating the multi-player game event to determine whether or not the generated multi-player game event corresponds to the winning multi-player game event; and
- making an award in respect of each of the gaming device or devices participating in the multi-player game, upon a determination that the generated multi-player game event corresponds to the winning multi-player game event.

The invention also provides computer program code which when executed by components of a controller of a gaming system implements any one of the above methods.

The invention also provides a tangible computer readable medium comprising the above computer program code.

Per various aspects of the present disclosure, a gaming system includes:
- a controller;
- gaming devices coupled to the controller and configured to participate in a multi-player game comprising a plurality of rounds, each gaming device comprising a player interface and a display device, wherein each gaming device is configured to:
  - initiate a sync timer in response to a sync command received from the controller;
  - receive, via its respective player interface, a selection of at least one display position from a plurality of display positions for its respective display device;
  - accept the selection of the at least one display position if its respective sync timer has not expired; and
  - for each round of the plurality of rounds,
    - display on its respective display device a respective modified game outcome, the respective modified game outcome corresponding to a respective initial game outcome that is modified based on the selection of the at least one
display position received from its respective player interface; and and update a respective score based on its respective modified game outcome;
wherein the controller is configured to execute instructions stored in a memory, the instructions when executed, cause the controller to at least send the sync command to the plurality of gaming devices and identify a winning gaming device of the plurality of gaming devices based on the respective scores of the plurality of gaming devices.

Per further aspects of the gaming system,
the sync command includes an expiration period for the respective sync timers of the plurality of gaming devices;
the controller initiates a master sync timer and sends a sync update command comprising time remaining before expiration of the master sync timer;
each gaming device receives the sync update command and updates its respective sync timer based on the time remaining provided by the received sync update command;
the controller generates the respective initial game outcome for each gaming device;
the controller generates the respective modified game outcome displayed by each gaming device based on the selection of the at least one display position received from each respective player interface;
each gaming device generates its respective modified game outcome based on the selection of the at least one display position received via its respective player interface;
each gaming device generates its respective initial game outcome;
each gaming device generates its respective modified game outcome based on the selection of the at least one display position received via its respective player interface; and/or
each gaming device generates its respective modified game outcome by replacing symbols at each display position of the selection of the at least one display position with a function symbol.

Further aspects of the disclosure may involve a method of gaming per a multi-player game having a plurality of rounds. The method may include:
broadcasting a sync command from a controller to a plurality of gaming devices;
opening, a respective window for each gaming device from the plurality of gaming devices, in response to receiving the sync command from the controller; and
receiving, via a respective player interface of each gaming device during its respective open window, a selection of at least one display position from a plurality display positions for a respective display device of each gaming device; and
for each round of the plurality of rounds,
displaying, at each gaming device, a respective modified game outcome, the respective modified game outcome corresponding to an initial game outcome for the respective gaming device that is modified based on the selection of the at least one display position received for the respective gaming device; and
updating, at each gaming device, a respective score based on its respective modified game outcome; and identifying, with the controller coupled to the plurality of gaming devices, a winning gaming device of the plurality of gaming devices based on the respective scores of the plurality of gaming devices.

Per further aspects, the method may include:
each gaming device setting an expiration period of its respective window based on an expiration period provided by the received sync command;
opening a window for the controller; and
periodically broadcasting, from the controller, a sync update command comprising timing remaining for the window of the controller;
receiving, with each gaming device, the sync update command; and
updating the respective window of each gaming device based on the time remaining provided by the received sync update command;
generating, with controller, the respective initial game outcome for each gaming device; and/or
generating, with the controller, the respective modified game outcome displayed by each gaming device based on the selection of display positions received from each respective player interface.

Additional aspects of the present disclosure may involve a non-transitory computer readable storage medium comprising instructions that when executed, cause a gaming device to:
receive a sync command from a controller;
open a window in response to receiving the sync command from the controller; and
receive, via a player interface of the gaming device, a selection of at least one display position from a plurality display positions of the gaming device;
accept the selection of the at least one display position if the selection is received within the open window; and
for each round of a plurality of rounds,
display a modified game outcome corresponding to an initial game outcome that is modified based on the selection of the at least one display position; and
update a respective score based on the modified game outcome; and
indicate a winning gaming device of the plurality of gaming devices.

Per further aspects, the non-transitory computer readable storage medium may include:
wherein execution of the instructions causes the gaming device to set an expiration period for the window per an expiration period specified by the received sync command;
wherein execution of the instructions causes the gaming device to update the expiration period of the window based on time remaining provided by a received sync update command; and/or
wherein execution of the instructions causes the gaming device to generate its modified game outcome by replacing a symbol at the selected display position with a function symbol.

BRIEF DESCRIPTION OF THE DRAWINGS OF THE INVENTION

An exemplary embodiment of the invention will now be described with reference to the accompanying drawings.

DETAILED DESCRIPTION OF A PREFERRED EMBODIMENT OF THE INVENTION

Overview of Gaming System

Figure 1:
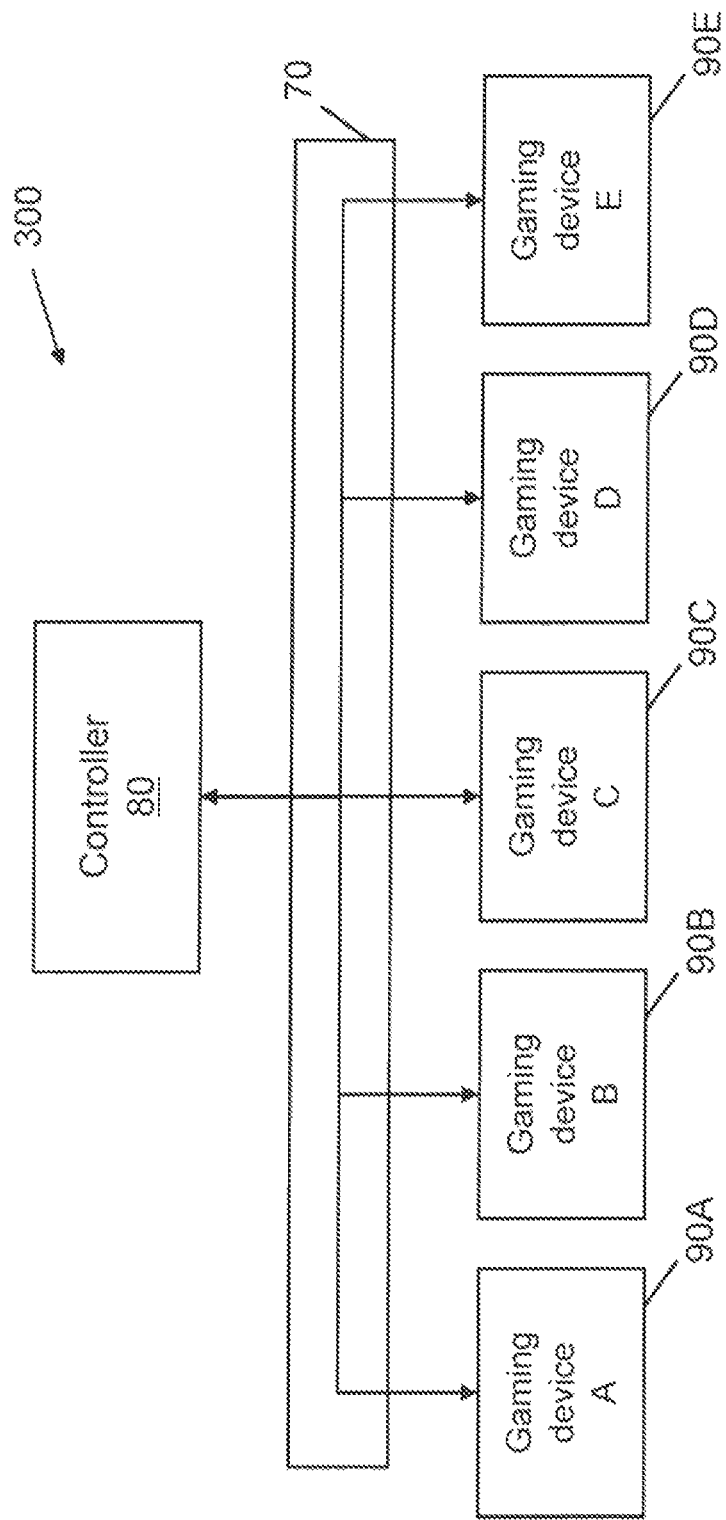
FIG. 1 is a block diagram of a gaming system.

Referring to FIG. 1, there is shown a gaming system 300 comprising a bank of gaming devices 90 and a controller 80 in data communication over a network 70 with the bank of gaming devices 90. Each of the gaming devices 90 is operable to participate in a multi-player game, and the controller 80 is arranged to generate one or more multi-player game events in respect of the multi-player game. In a "tournament game mode" embodiment, for each multi-player event, the gaming system 300 receives a player input from each gaming device 90 participating in the multi-player game, and generates a modified multi-player game event for each participating gaming device 90. The gaming system 300 then evaluates the modified multi-player game events to identify at least one winning gaming device 90, and makes an award in respect of the at least one winning multi-player gaming device 90. In a "non-tournament game mode" embodiment, the gaming system 300 evaluates a generated multi-player game event to determine whether or not the generated multi-player game event corresponds to a winning multi-player game event. If the gaming system 300 determines that the generated multi-player game event corresponds to the winning multi-player game event, the controller 80 makes an award in respect of each of the gaming devices participating in the multi-player game.

Persons skilled in the art will appreciate that the controller 80 and the gaming devices may be located at the same location or at different locations. For example, in one embodiment, the controller 80 and the gaming devices 90 may be at different premises and the controller 80 may be connected to the gaming devices 90 via the Internet. In another embodiment, one or more of the gaming devices 90 may be located at a different location to the other ones of the gaming devices and the two separate groups of gaming devices 90 may be connected to the same controller 80 via different networks. The network connecting each gaming device 90 to the controller 80 may be a local area network (such as Wi-Fi) or wide area network (such as a mobile data communication network) and may include devices other than the controller 80 and the gaming devices 90 (such as hand-held or mobile devices, cloud-based devices or other networking hardware).

General Construction of Gaming Devices

The gaming devices 90 of the gaming system 300 can take any suitable form including stand-alone gaming machines and server based gaming terminals.

Figure 2:
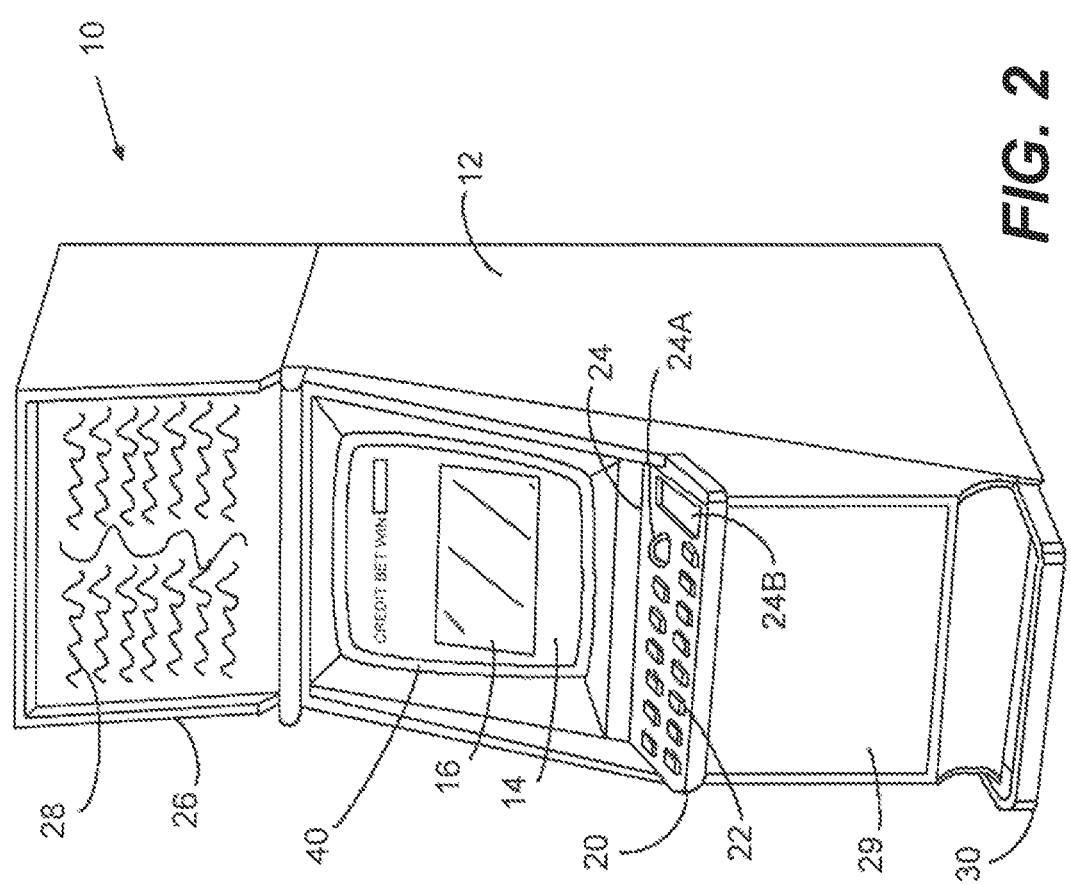
FIG. 2 is a perspective view of a stand-alone gaming machine.

A gaming device in the form of a stand-alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
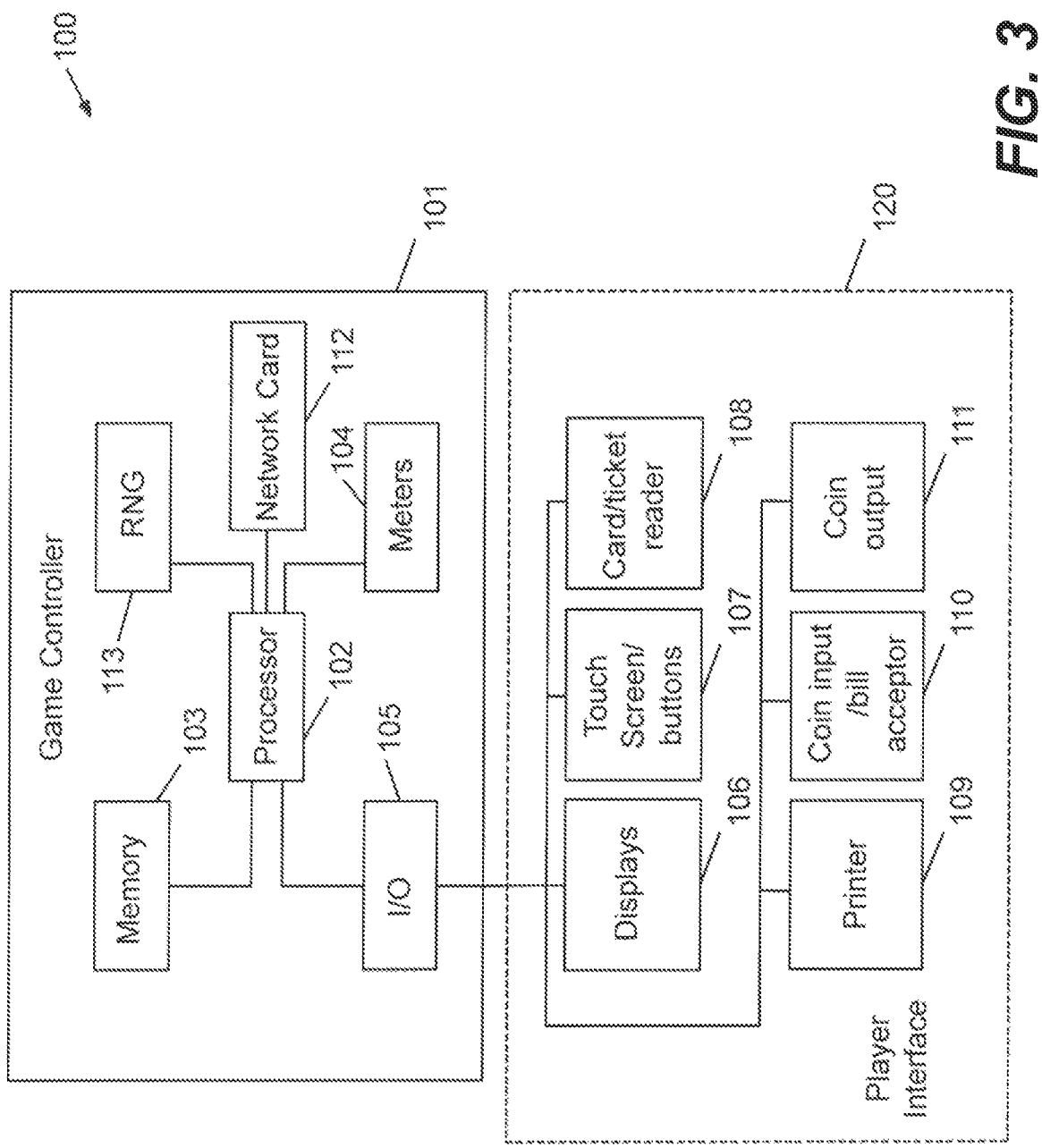
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103. Herein the term "processor" is used to refer generically to any device that can process game play instructions in accordance with game play rules and may include: a microprocessor, microcontroller, programmable logic device or other computational device, a general purpose computer (e.g., a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

The gaming machine has hardware meters 104 for purposes including ensuring regulatory compliance and monitoring player credit, an input/output (110) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110, and a coin output mechanism 111.

Additional hardware may be included as part of the gaming machine 100, or hardware may be omitted as required for the specific implementation. For example, while buttons or touch screens are typically used in gaming machines to allow a player to place a wager and initiate a play of a game, any input device that enables the player to input game play instructions may be used.

In addition, the gaming machine 100 may include a communications interface, for example a network card 112. The network card may, for example, send state information to a controller to communicate the state of the gaming machine 100 to the controller, and receive data or commands from a controller that controls the gaming machine 100. In embodiments employing a player marketing module, communications over a network may be via player marketing module—i.e., the player marketing module may be in data communication with one or more of the above devices and communicate with it on behalf of the gaming machine.

Figure 4:
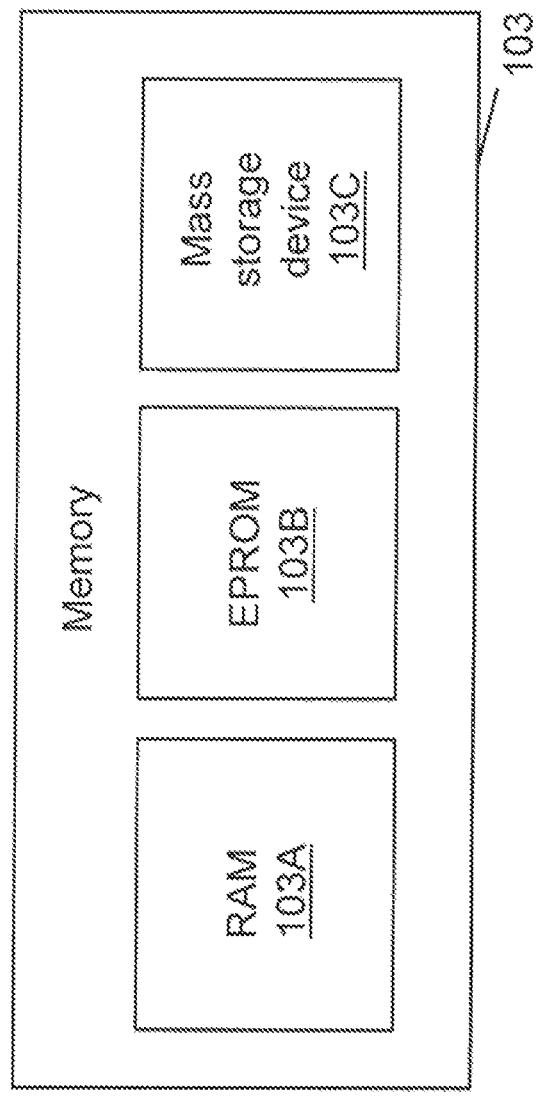
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference.

Figure 5:
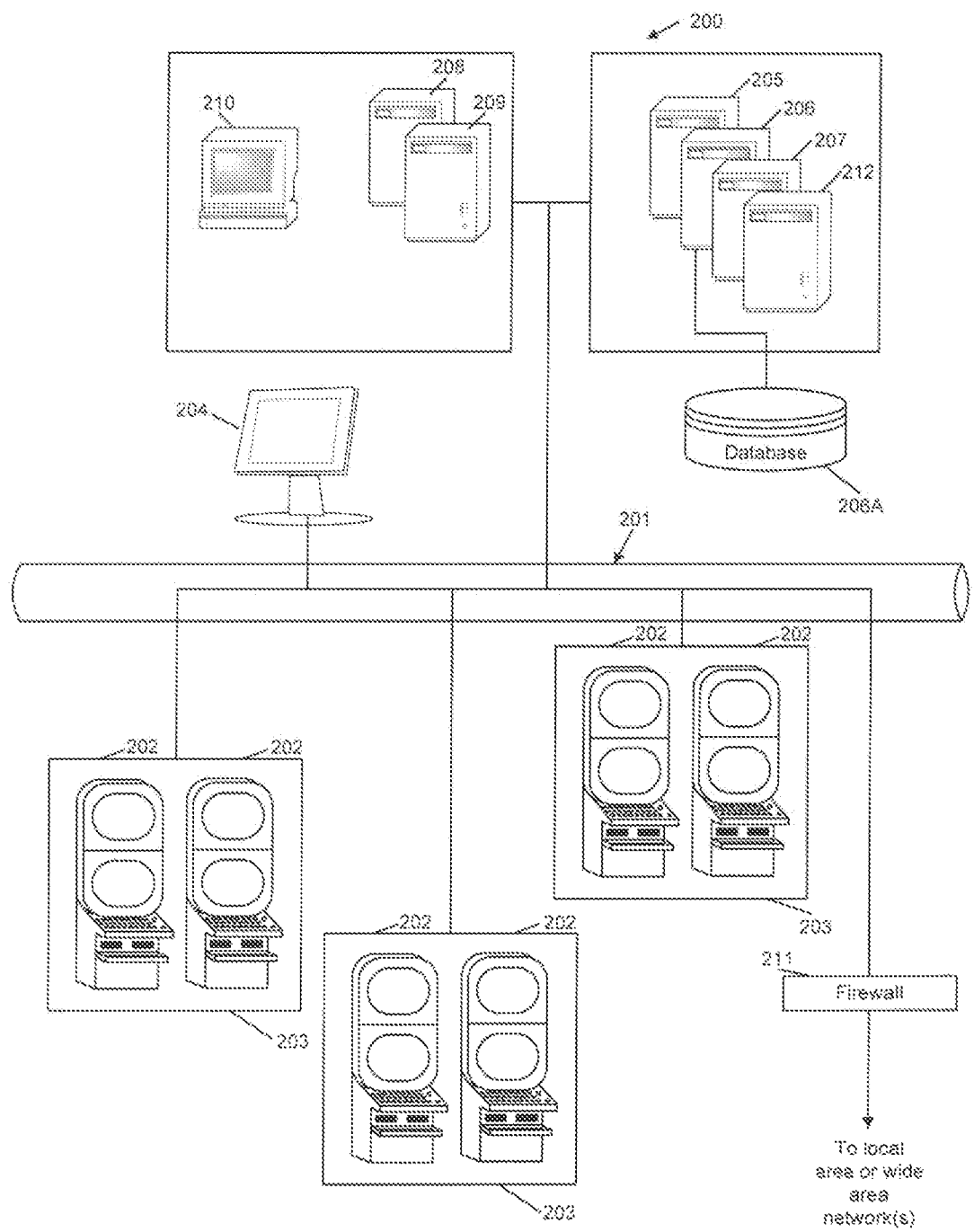
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

Although not shown in FIG. 5, the gaming machines 202 of each bank 203 may also be in direct data communication with each other. For example, each gaming machine may be directly connected to another gaming machine via an Ethernet network separate from the network 201. In another example, the gaming machines may be connected wirelessly via a wireless local area network (WLAN). In yet another example, there may simply be serial or parallel connections from each gaming machine to all the other gaming machines in the bank.

One or more displays 204 may also be connected to the network 201. For example, the displays 204 may be associated with one or more banks 203 of gaming machines. The displays 204 may be used to display representations associated with game play on the gaming machines 202, and/or used to display other representations, such as promotional or informational material. For example, an overhead display can be arranged above a bank of gaming machines so as to allow all players to easily view the play of others.

A controller can be provided within the network 200 by a server 208 that is in data communication with one or more of the banks 203 of gaming machines 202, such that the server 208 can generate game events for a multi-player game playable at the gaming machines 202.

A game server 205 may be used to perform some of the processing required for certain games. For example, the game server 205 could run a random number generator engine. Alternatively, a separate random number generator server could be provided. Further, persons skilled in the art will appreciate that a plurality of game servers could be provided to run different games or a single game server may run a plurality of different games as required by the terminals.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Details of the Gaming System

In various embodiments of the gaming system 300, each gaming device 90 is a stand-alone gaming machine that allows play of a multi-player game in the form of a multi-player spinning reel type game. Persons skilled in the art will appreciate that an alternative embodiment of the gaming system 300 may provide a multi-player game that is not a spinning reel type game.

In order to participate in the game, the player operates the gaming device 90 to specify a wager (and hence the win entitlement which will be evaluated for this play of the game) and initiates a play of the game. Persons skilled in the art will appreciate that a player's win entitlement will vary from game to game dependent on player selections. In most spinning reel games, it is typical for the player's win entitlement to be affected by the amount they wager and selections they make (i.e., the nature of the wager). For example, a player's win entitlement may be based on how many lines they play in each game—e.g., a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of pay lines and are an inherent part of the win entitlement.

Persons skilled in the art, will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

In other embodiments a player win entitlement may be affected by purchasing access to particular pay tables—e.g., a first bet amount entitles the player to wins including cherries and a second amount entitles them to wins including plums.

In various embodiments, the multi-player spinning reel type game playable on each gaming device 90 has three different modes of play: a base game mode, a bonus feature game mode and a tournament game mode. However, it is envisaged that the multi-player spinning reel type game may not have three different modes of play. For example, the multi-player spinning reel type game may only have a single tournament game mode of play.

In the base game mode, each gaming device 90 plays its "own" spinning reel type game but a win (that is, a winning symbol combination) on any one of the gaming devices 90 participating in the multi-player game results in a win to all of the participating gaming devices 90. In the bonus feature game mode, a bonus feature option (or options) selected by the player of a designated one of the gaming devices 90 participating in the multi-player game is applied to the spinning reel type games played on all of the gaming devices 90 participating in the multi-player game. That is, a lead player (that is, the player on the designated gaming device 90 participating in the multi-player game) gets to select a bonus feature option or options (for example, a higher multiplier with less free spins such as 5 free spins with a 4× award multiplier, a lower multiplier with more free spins such as 10 free spins with a 2× award multiplier) for the players on all of the other participating gaming devices 90. In another words, the lead player can control volatility of the game through selection of a bonus feature option (or options). In various embodiments, the designated gaming device 90 is the participating gaming device 90 that specifies the biggest wager (that is, the player that wagers the most credits). However, it is envisaged that the designated gaming device 90 may not be the participating gaming device 90 that specifies the biggest wager in alternative embodiments. For example, in an alternative embodiment, the designated gaming device 90 may be a randomly designated one of the gaming devices 90 participating in the multi-player game.

In the tournament game mode, the symbols selected for play on each participating gaming device 90 are the same. That is, the gaming devices 90 participating in the multi-player game share the same spins. However, the player on each participating gaming device 90 may make an independent player selection to modify the selected symbols. That is, the player on each participating gaming device 90 may select one or more display positions such that on the gaming device 90 symbols selected for display at these display positions are converted to a function symbol. Thus, the outcomes for the participating gaming devices 90 may be different if the players on the participating gaming devices 90 make different player selections.

Figure 6:
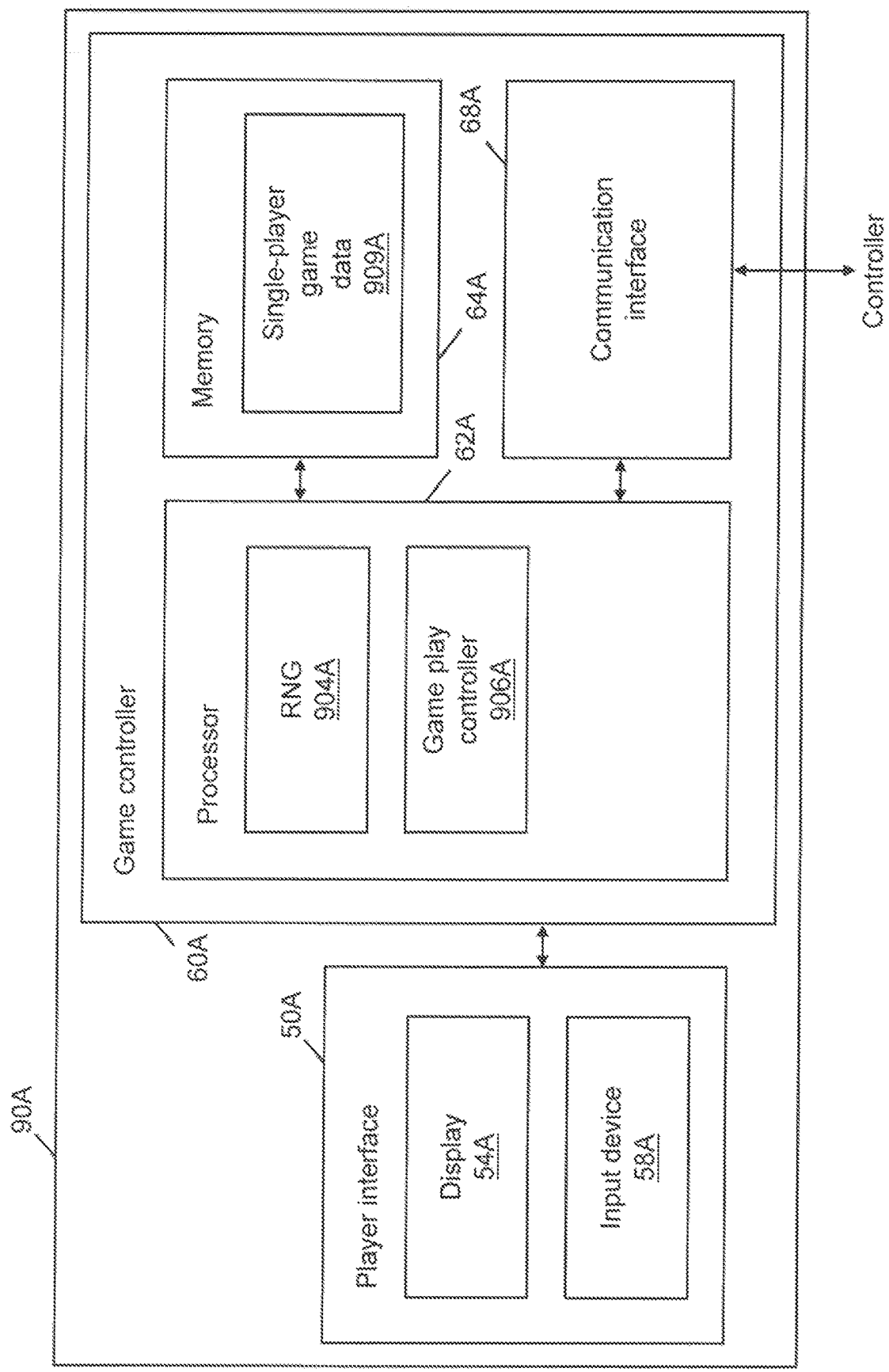
FIG. 6 is a functional block diagram of a gaming device of a gaming system.

FIG. 6 is a functional block diagram of one of the gaming devices 90A of a "non-tournament game mode" embodiment of the gaming system 300. Persons skilled in the art will appreciate that this FIG. illustrates only the core components of a gaming device 90 of one possible embodiment of the gaming system 300 and that a gaming device 90A of another embodiment of the gaming system 300 may include alternative or additional components.

As indicated above, each gaming device 90A of the gaming system 300 enables a player to play a multi-player spinning reel type game. In this "non-tournament game mode" embodiment, the multi-player spinning reel type game is essentially a number of separate spinning reel type games being played at participating gaming devices 90A where a win on any one of the participating gaming devices 90A results in a win to all of the participating devices 90A. Thus, even though there is no competition or cooperation between players at the participating gaming devices 90A, the shared results provide the players with a "community feeling" that encourages longer, more enjoyable game play.

The gaming device 90A comprises a player interface 50A and a game controller 60A. The player interface 50A comprises a display 54A for displaying the multi-player spinning reel type game to a player. That is, the display 54A is arranged to display at respective ones of a plurality of display positions a plurality of symbols selected in respect of the multi-player spinning reel type game. It is envisaged that, in an alternative embodiment, the display 54A may be arranged to display a single-player game in addition to the multi-player game, and that the display 54A may display at any single point in time a single-player game, a multi-player game, or both a single-player game and a multi-player game. Also, it is envisaged that, in an alternative embodiment, the multi-player game may be displayed on a separate display that is not part of the gaming device 90A. For example, in an alternative embodiment, the display 54A of each gaming device may display only a single-player game, and an associated display that is separate to the gaming device 90 may be used to display the multi-player game.

The player interface 50A also comprises an input device or a game play mechanism 58A that enables the gaming device 90A to receive an input from a player such as a wager (in particular, a wager indicating the number of rounds or plays of the multi-player game in which the player wishes to participate) or game play instructions (in particular, a selection of one or more of the display positions of the display 54A where the player would like to modify). It is envisaged that, in an embodiment, the multi-player game may be offered in predetermined groupings, for example, 1, 5, 10, 25 or 100 rounds or plays.

The game controller 60A comprises a processor 62A and memory 64A. The processor 62A is shown implementing a number of modules based on program code and data stored in memory 64A. Persons skilled in the art will appreciate that the modules are based typically on program code and data stored in memory. Persons skilled in the art will also appreciate that the modules need not be implemented using a processor or be based on program code and data stored in memory and that one or more of the modules could be implemented in some other way, for example, by a dedicated circuit.

The modules implemented by the processor 62A include a game play controller 906A and a random number generator (RNG) 904A arranged to generate random numbers (or pseudo-random numbers). The game play controller 906A is arranged to generate and evaluate game events for a single-player game based on single-player game data 909A stored in memory 64A and the random numbers (or pseudo-random numbers) generated by the RNG 904A. Persons skilled in the art will appreciate that the single-player game data 909A typically includes the rules of the game, the probability of winning, or the award(s) that can be made to a player. In various embodiments, the single-player game data 909A are stored in memory 64A. However, a person skilled in the art will appreciate that the single-player game data 909A may alternatively be stored in a remote storage device (or remote storage devices) in an alternative embodiment.

The game controller 60A also includes a communication interface 68A to allow the gaming device 90A to communicate with the controller 80A. For example, the communication interface 68A allows the gaming device 90A to transmit or relay communications received from the input device 58A to the controller 80A, and to receive communications from the controller 80A.

Figure 7:
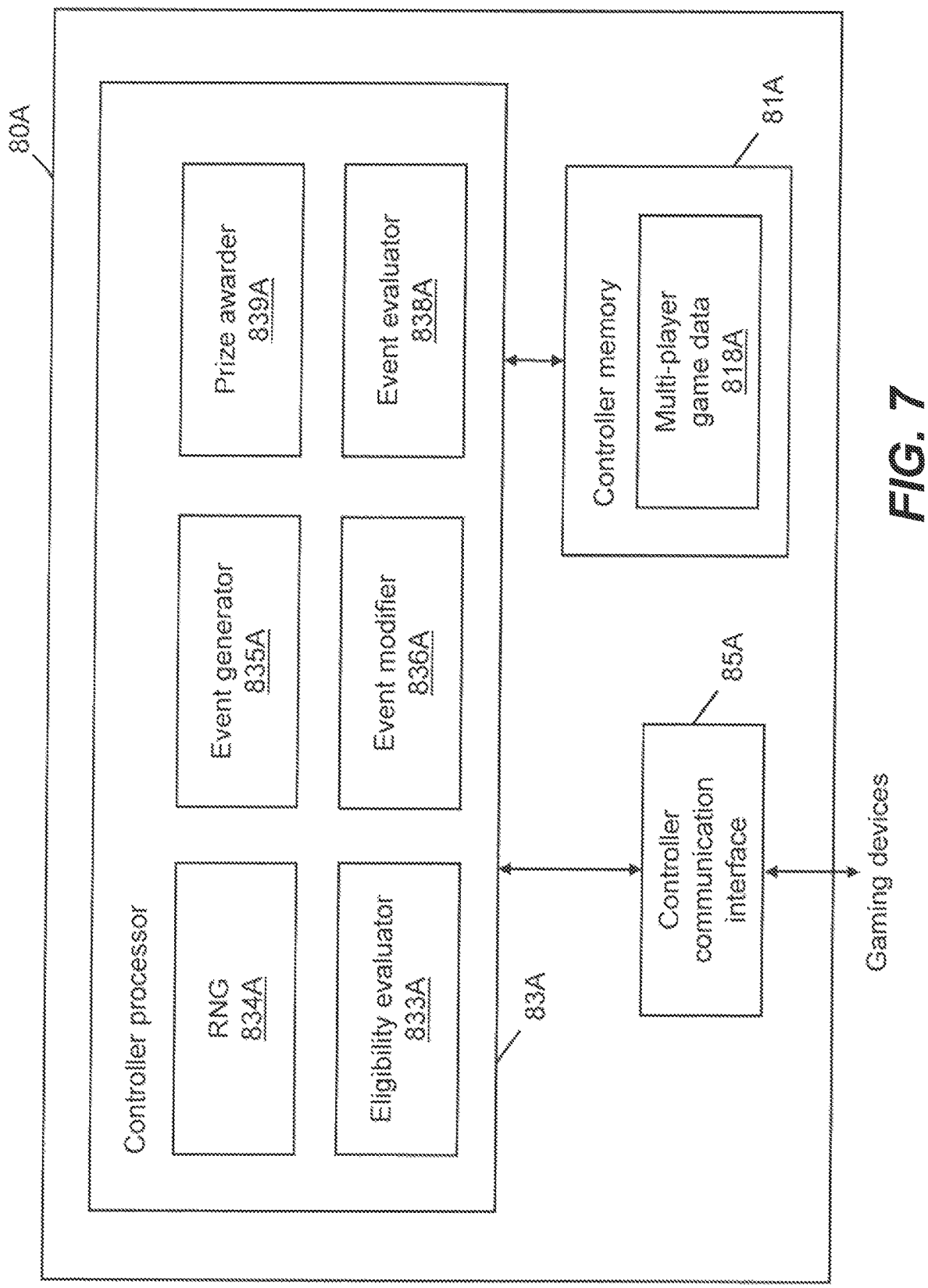
FIG. 7 is a functional block diagram of a controller of the gaming system of FIG. 6.

FIG. 7 is a functional block diagram of the controller 80A of the "non-tournament game mode" embodiment of the gaming system 300. The controller 80A comprises a controller memory 81 and a controller processor 83A. The controller 80A also includes a controller communication interface 85A for allowing the controller 80A to communicate with the gaming device 90A. For example, the controller communication interface 85A allows an eligibility evaluator 833A to monitor each gaming device 90A for receipt of an input to participate in a multi-player game, and enables the controller 80A to transmit to each participating gaming device 90A symbols selected for display at the gaming device 90A and any awards made in respect of the gaming device 90A.

Like the processor 62A of the game controller 60A of FIG. 6, the controller processor 83A of FIG. 7 is shown implementing a number of modules implemented based on program code and data. However, persons skilled in the art will appreciate that one or more of the modules can be implemented in some other way, for example, by a dedicated circuit in an alternative embodiment.

One of the modules implemented by the controller processor 83A is the above described eligibility evaluator 833A that monitors each gaming device 90 for a player input. The eligibility evaluator 833A is arranged to evaluate the player input received from a gaming device via the controller communication interface 85A. More specifically, the eligibility evaluator 833A evaluates the input to determine whether or not the gaming device 90A is eligible to participate in the multi-player game based on the input (that is, a wager) from a player to participate in a multi-player game. For example, in an embodiment, the eligibility evaluator 833A may evaluate the wager by a player to determine whether or not the wager is sufficient to participate in the multi-player game. In another embodiment, the input from a player may additionally indicate the number of rounds of the multi-player game the player wishes to participate in, and the eligibility evaluator 833A may evaluate the input to determine whether or not the gaming device is eligible to participate in the indicated number of rounds based on the amount wagered by the player.

The controller processor 83A also implements a RNG 834A, a multi-player game event generator 835A, a multi-player game event modifier 836A and a multi-player game event evaluator 838A. The game event generator 835A is arranged to generate a multi-player game event for the multi-player spinning reel type game based on random numbers (or pseudo-random numbers) generated by the RNG 834A and multi-player game data stored in the controller memory 818A. The game event modifier 836A is arranged to modify, for each gaming device 90A participating in the multi-player spinning reel type game, the multi-player game event generated by the game event generator 835A based on a player selection received from the input device of the participating gaming device 90A. The game event evaluator 838A is arranged to evaluate, for each gaming device 90A participating in the multi-player spinning reel type game, the multi-player game event modified by the game event modifier 836A for the participating gaming device 90A based on the multi-player game data stored in the controller memory 818A to determine whether or not the multi-player game event corresponds to a winning multi-player game event.

The multi-player game event generator 835A is a symbol generator arranged to select a plurality of sets of symbols in respect of respective display positions of the multi-player spinning reel type game.

The multi-player game event modifier 836A is a symbol modifier arranged to modify, for each gaming device 90A participating in the multi-player spinning reel type game, one or more symbols selected by symbol generator 835 based on a player selection received from the input device of a participating gaming device 90A. Depending on the embodiment, the modification for a participating gaming device 90A may be based on a player selection received from either the same participating gaming device 90A or another participating gaming device 90A.

In various embodiments, the symbol modifier 836A modifies each selected symbol by modifying each of the selected symbols corresponding to the display positions selected by the player to a WILD symbol. It is envisaged that, in an alternative embodiment, each of the selected symbols may be modified to a different function symbol such as a multiplier. Also, in some embodiments, a player may be provided with multiple function symbols and that, for each round of play, a different function symbol (or different function symbols) may be applied to the display positions selected by each player. For example, in one embodiment, a player may be provided with a WILD symbol for one round of play and a multiplier for another round of play.

The multi-player event evaluator 838A is a symbol evaluator arranged to evaluate the symbols (that is, the symbols selected by the symbol generator 835A and then modified by the symbol modifier 836A) to determine whether or not the symbols correspond to a winning symbol combination. The symbols evaluated by the symbol evaluator 835 may consist of the symbols modified by the symbol modifier 908A (that is, the modified symbols at the display positions selected by the player using the input device 54A) and the un-modified symbols selected for display at respective display positions of the display.

The modules implemented by the controller processor 81A also include a prize awarder 839A arranged to make awards to gaming devices 90A participating in the multi-player spinning reel type game. Specifically, the prize awarder 839A makes an award to each participating gaming device 90A based on award data stored in the controller memory 81A, upon a determination by the symbol evaluator 835A that the symbols selected by the symbol generator 835A and subsequently modified by the symbol modifier 836A (if symbols selected by the symbol generator 835A were subsequently modified by the symbol modifier 835A) for one of the participating gaming devices 90A correspond to a winning symbol combination.

In various embodiments, the symbols selected by the symbol generator 835A are first transmitted via the controller communication interface 85A to each participating gaming device for display on the display 54A of the gaming device 90A, before the symbols modified by the symbol modified 836A are then separately transmitted via the controller communication interface to the gaming device 90A for display on the display 54A of the gaming device 90A. However, it is envisaged that this need not be the case. For example, in an alternative embodiment, the selected symbols and the modified symbols for display at each gaming device 90A may be transmitted together. It is also envisaged that, in an alternative embodiment, symbols may not be transmitted to the gaming devices 90A for display but awards are transmitted to the participating gaming devices 90A.

Persons skilled in the art will appreciate that some of the components (for example, the event modifier 836A or the event evaluator 838A) implemented by the controller 80A may be implemented by each gaming device. Persons skilled in the art will also appreciate that the controller 80A may include other components. It is also envisaged that the gaming system 300 may involve other devices. For example, in an embodiment, the multi-player game may be displayed to players on stand-alone multi-player game displays respectively associated with the gaming devices 90A, and the controller 80A may additionally include a communication interface for communicating with each of these stand-alone multi-player game displays.

As indicated above, the multi-player game may not be a spinning reel type game. For example, in an alternative embodiment, the multi-player game may be a stud poker game. In yet another embodiment, the multi-player game may be a bingo game.

Figure 8:
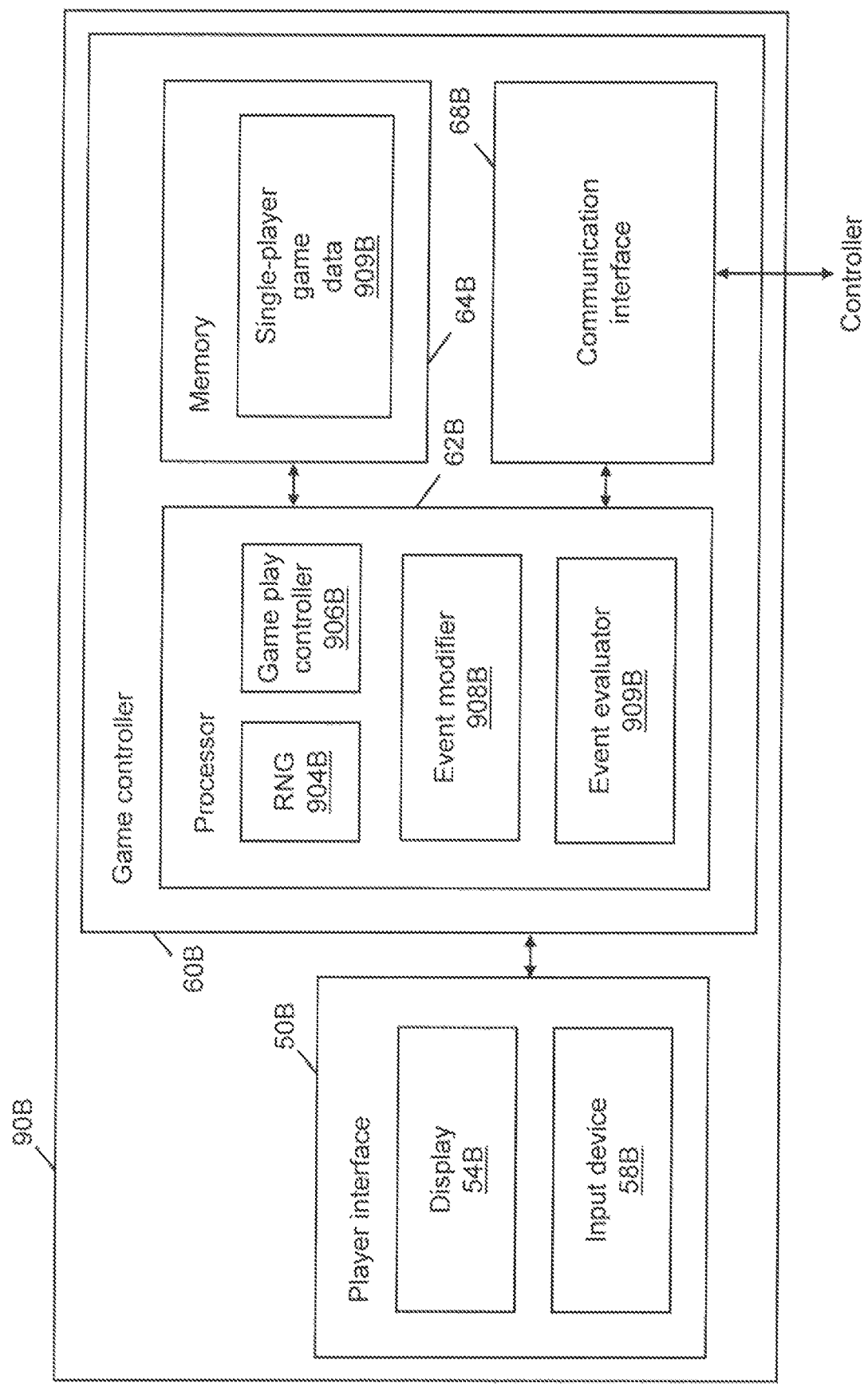
FIG. 8 is a functional block diagram of a gaming device of another gaming system.

FIG. 8 is a functional block diagram of a gaming device 90B of a "tournament game mode" embodiment of the gaming system 300. In this "tournament game mode" embodiment, game events are modified and evaluated by each gaming device 90B (rather than by the controller and awards are made only to a predetermined one or more of the participating gaming devices 90B (that is, to only the winning gaming devices 90B). Also, a trigger monitor 831B is implemented by the controller 80B to monitor a trigger event for a trigger condition to initiate the multi-player game. As described in further detail below, depending on the embodiment, players at participating gaming devices 90B may or may not be permitted make player selections after each round of play of the multi-player game. In an embodiment where players at participating gaming devices 90B do not make player selections after each round of play of the multi-player game, the multi-player game can be played for multiple rounds without any player interaction after initial player selection. For example, after a 100-game grouping (that is, a multi-player game with 100 rounds of play) is wagered upon by players at participating gaming devices 90B, no further player interaction is required until all 100 rounds of play are completed. As indicated above, the multi-player game may be offered in any number of predetermined groups, for example, 1, 5, 10, or 100 rounds or plays.

Like the gaming device 90A of the "non-tournament game mode" embodiment, the gaming device 90B in FIG. 8 comprises a game controller 60B and a player interface 50B. The player interface 50B comprises a display 54B for displaying the multi-player spinning reel type game and an input device 58B that enables the gaming device 90B to receive an input, that is, a wager for initiating the game, and a player selection of display positions for modification.

The game controller 60B comprises a memory 64B and a communication interface 68B in communication with the controller 80B of the gaming system 300. The game controller 60B also comprises a processor 62B for implementing modules based on program code and data stored in the memory 64B. A person skilled in the art will appreciate that the modules need not be implemented using a processor or be based on program code and data stored in memory and that one or more of the modules could be alternatively implemented, for example, by a dedicated circuit.

As indicated above, in contrast to the "non-tournament game mode" embodiment of the gaming system 300 of FIGS. 6 and 7, game events in this "tournament game mode" embodiment of the gaming system 300 are modified and evaluated by each gaming device 90B. Firstly, game event modification is performed by an event modifier 908B implemented by the processor 62B Like the event modifier 836A of the "non-tournament game mode" embodiment, the event modifier 908B of this "tournament game mode" embodiment is a symbol modifier arranged to modify one or more symbols selected for display at respective display positions. When in use, the symbol modifier 908B modifies the selected symbols by modifying each of the selected symbols to a function symbol (which, for example, may be a WILD symbol or a multiplier) based on the player selection of the display positions received from the input device 58B. It is envisaged that, in an alternative embodiment, the event modifier 908B may be configured to modify not only symbols. For example, in addition or as an alternative to a symbol modifier, the event modifier 908B may also be an award modifier arranged to modify an award or awards made by a controller 80B.

The processor 62B also implements an event evaluator 909B to perform game event evaluation Like the event evaluator 838A of the "non-tournament game mode" embodiment, the event evaluator 909B of this "tournament game mode" embodiment is a symbol evaluator arranged to evaluate a multi-player game event in the form of selected symbols to determine whether or not the symbols correspond to a winning multi-player game event in the form of a winning symbol combination. The symbols evaluated by the symbol evaluator 909B consist of the symbols modified by the symbol modifier 908B (that is, the symbols at the display positions selected by the player using the input device 54B) and the selected symbols not modified by the symbol modifier 908B (that is, the symbols at the display positions not selected by the player using the input device 54B). The outcome of each evaluation by the event evaluator 909B is communicated via the communication interface 68B to the controller 80B. In various embodiments, each outcome is a score which is communicated via the communication interface 68B to the controller 80B such the controller 80B may tally the total scores in respect of a plurality of multi-player game events (that is, multiple rounds of the multi-player game) to identify at least one winning gaming device 90B.

The modules implemented by the processor 62B also include a game play controller 906B for generating and evaluating game events for a single-player game based on single-player game data 909B stored in memory 64B and random numbers (or pseudo-random numbers) generated by a RNG 904B.

Figure 9:
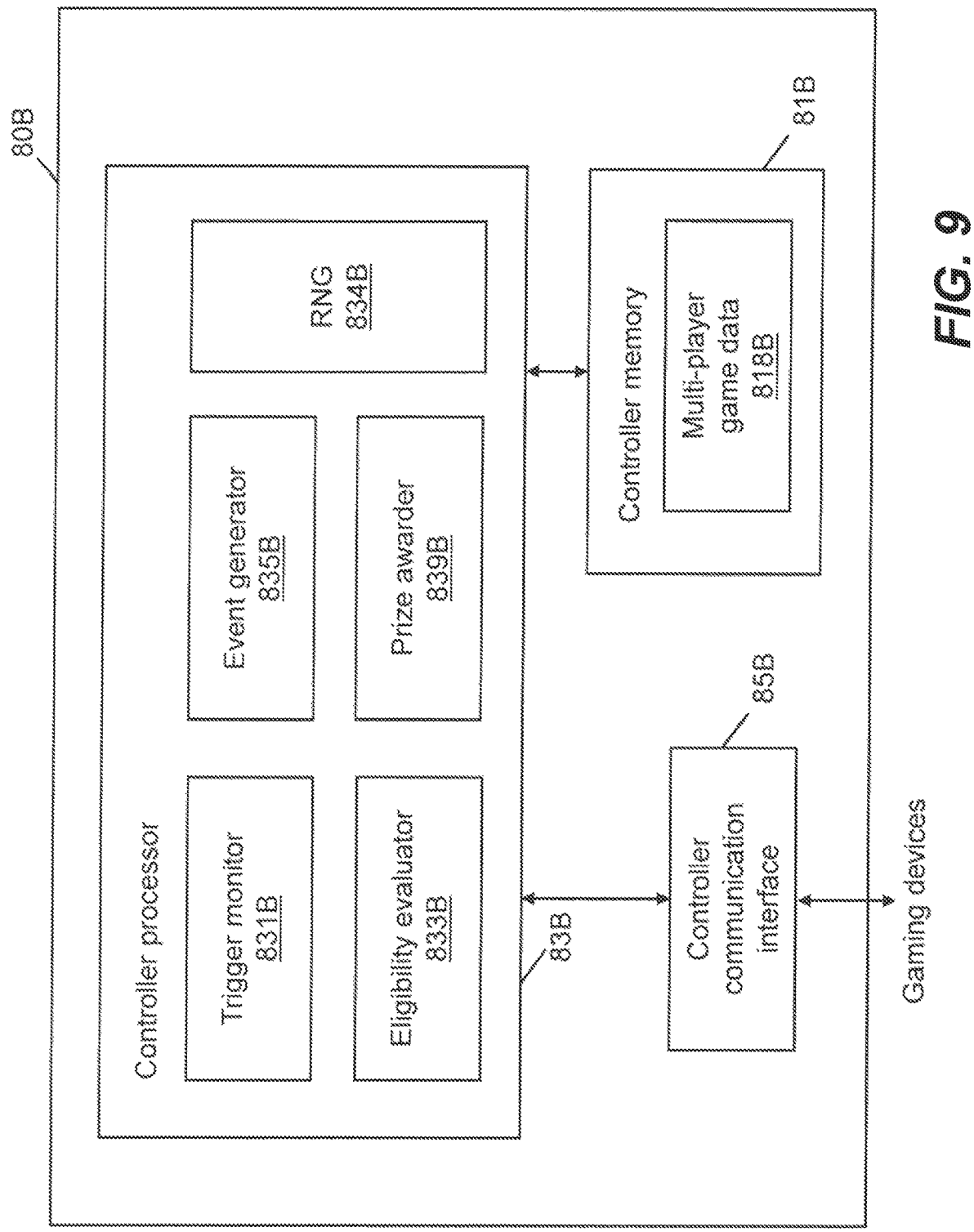
FIG. 9 is a functional block diagram of a controller of the gaming system of FIG. 8.

FIG. 9 is a functional block diagram of the controller 80B of the "tournament game mode" embodiment of the gaming system 300. As indicated above, in this "tournament game mode" embodiment, a trigger monitor 831B is implemented to monitor a trigger device to determine whether a trigger condition is met. The trigger monitor 831B is implemented by the controller processor 83B of the controller 80B. In various embodiments, the trigger device is a RNG 834B implemented by the controller 80B, and the trigger condition is the generation of one of one or more predetermined numbers by the RNG 834B. When in use, the trigger monitor 831 monitors the RNG 834B for the generation of one of the predetermined numbers, and initiates a multi-player spinning reel type game involving the gaming devices 90B that are eligible to participate in the multi-player game upon the generation of one of the predetermined numbers by the RNG 834B. It is envisaged that different predetermined numbers may be associated with different tiered tournament games. For example, generation of a number from 1 to 100 triggers a minor tournament, a number from 101 to 110 triggers a major tournament, and a number 111 triggers a grand tournament. The tournament game mode is triggered at random in various embodiments. However, it is envisaged that, in an alternative embodiment, the trigger monitor 831B may alternatively not be monitoring a RNG 834B, the trigger condition may alternatively not be one or more predetermined numbers generated by a RNG 834B, and the tournament game mode may alternatively not be triggered randomly. For example, the trigger monitor 831B may alternatively be a user interface connected to the controller 80B and the trigger condition may alternatively be an input by a user of the controller 80B (for example, an operator of the gaming system 300 such as a casino operator) to initiate a multi-player game. It is also envisaged that some embodiments may involve multiple triggers and that a tournament game mode may be triggered by different trigger conditions. Also, it is envisaged that there may be different tournament game modes and that each of the different tournament game modes may be triggered by different trigger conditions.

The trigger monitor 831B is just one of a number of modules implemented by the controller processor 83B. Like the controller 80A of the "non-tournament game mode" embodiment, the controller processor 83B also implements an eligibility evaluator 833B arranged to evaluate a player input to participate in a multi-player game received from a gaming device 90B to determine whether or not the gaming device 90B is eligible to participate in the multi-player game. Like the controller communication interface 85A of the "non-tournament game mode" embodiment, a controller communication interface 85B is provided in the controller 80B of various embodiments to allow communication between the controller 80A and each gaming device 90B such that the eligibility evaluator 833B can monitor each gaming device 90B for receipt of an input to participate in a multi-player game, and the controller 80B can transmit to each participating gaming device 90B symbols selected for display at the gaming device 90B and any awards made in respect of the gaming device 90B.

The controller processor 83B also implements a multi-player game event generator 835B in the form of a symbol generator arranged to select a plurality of sets of symbols in respect of the multi-player spinning reel type game. As indicated above, for the tournament game mode, the symbols selected for play on each participating gaming device 90B are the same. The symbols selected by the symbol generator 835B are transmitted via the controller communication interface of the controller 80B to each gaming device 90B participating in a multi-player game for display at the display 54B of each gaming device 90B. Before displaying to a player the symbols selected by the symbol generator 835B of the controller 80B, the event modifier 908B of a gaming device 90B modifies the selected symbols based on a player selection, and the symbol evaluator 909B evaluates the selected symbols (and modified symbols if any selected symbols were modified) to determine a score in respect of the symbols selected by the symbol generator 835B.

Like the controller processor 81A of the "non-tournament game mode" embodiment, the controller processor 81B of this "tournament game mode" embodiment also implements a prize awarder 839B arranged to make an award to a gaming device 90B based on award data stored in the controller memory 81B. In various embodiments, awards are made by the prize awarder 839B to a predetermined one or more of the participating gaming devices 90B that achieve scores that are higher than those achieved by the other participating gaming devices 90B. However, it is envisaged that this might not be the case in an alternative embodiment. For example, in an alternative embodiment, an award is made only to the participating gaming device 90B that achieves the top score. It is envisaged that awards may be made either at the end of each multi-player event generated by the controller 80B or at the end of the multi-player game. That is, awards may be made for each round of the multi-player game or only for an entire game. As indicated above, in an embodiment where prizes are awarded for the entire game, the prize awarder 839B may keep track of the scores for each round of play (that is, for each generated multi-player event) and add-up or tally the scores for all of the rounds of play to identify the winning one or ones of the participating gaming devices 90B.

It is envisaged that awards made in respect of a gaming device 90B by the prize awarder 839B may be based on a player input (that is, the wager made by the player on the gaming device 90B), or if the game is triggered by the trigger monitor 831B, be based on the random number (or pseudo-random number) that triggered the tournament game mode.

It is envisaged that awards made by the prize awarder 839B may be funded by a prize pool. The prize pool may in turn be funded by the wagers (for example, 10% of each wager) made by the participating gaming devices 90B, additional wagers (that is, "ante") wagers dedicated to awards for tournament game modes, and/or some other form of funding. It is envisaged that awards made by the prize awarder 839B may be funded by a plurality of different tiered prize pools. For example, awards in respect of a grand tournament may be derived from a $1 million prize pool, awards in respect of a major tournament may be derived from a $100,000 prize pool, and awards in respect of a minor tournament may be derived from only a $10,000 prize pool.

Figure 10:
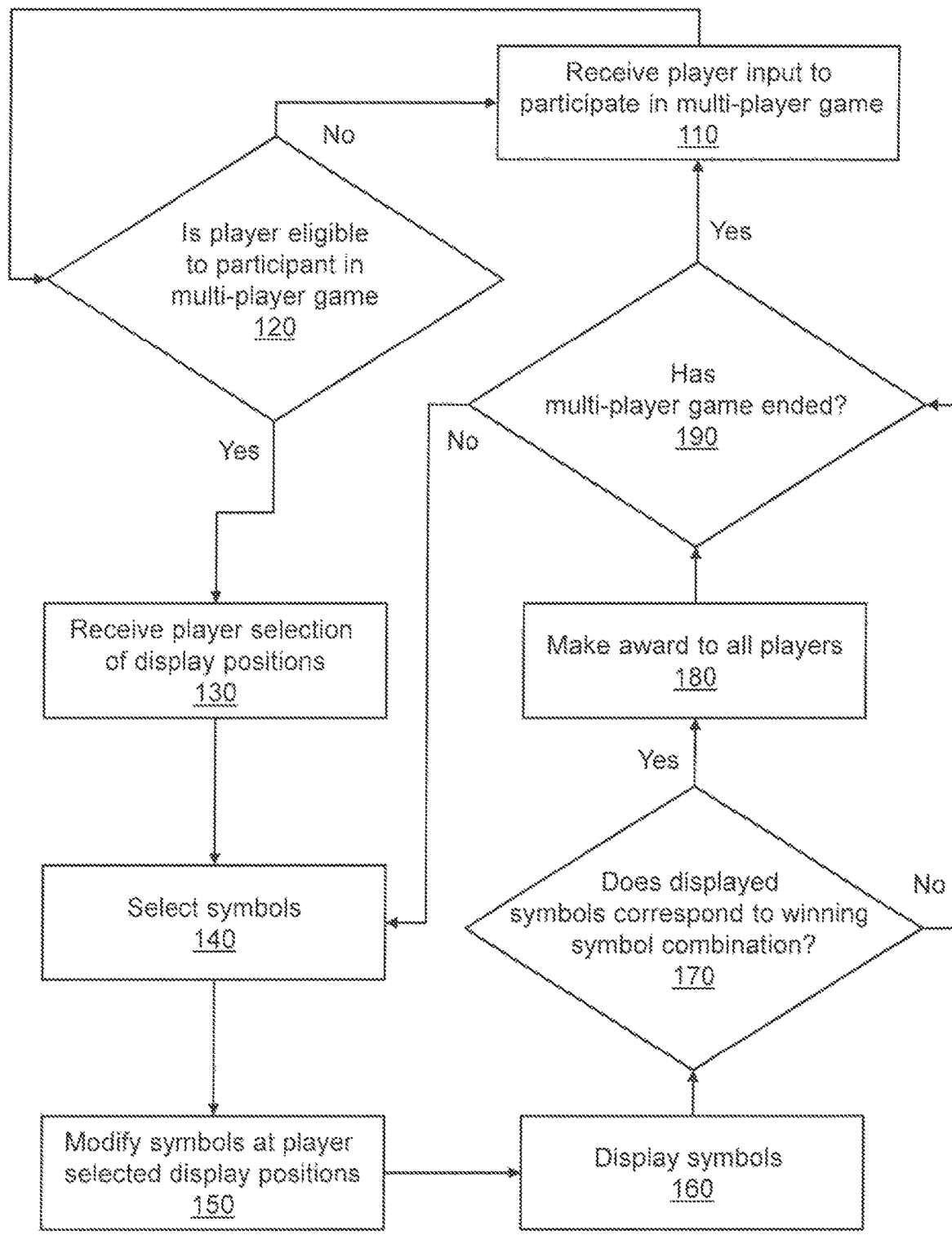
FIG. 10 is a flow chart of a method of gaming.

FIG. 10 is a flow chart of a method of gaming comprising a "non-tournament game mode" embodiment of the gaming system 300. At step 110, a player input in the form of a wager to participate in a multi-player spinning reel type game is received by the input device 58A of a gaming device 90A. As indicated above, the input may indicate the number of rounds of the multi-player game in which the player wishes to participate.

At step 120, an eligibility evaluator 833A implemented by the controller 80 evaluates the player input to determine whether or not the gaming device 90 is eligible to participate in the multi-player game. For example, the eligibility evaluator 833A may evaluate the player input to determine whether or not a wager made by the player is sufficient to participate in the multi-player game. If the input indicates the number of rounds of the multi-player game in which the player wishes to participate, the eligibility evaluator 833A evaluates the input to determine whether or not the gaming device 90A is eligible to participate in the indicated number of rounds based on the amount wagered by the player.

In any event, if the eligibility evaluator 833A determines that a gaming device 90A is not eligible to participate in the multi-player game, the gaming device 90A waits for another player input to participate in a tournament game mode of a multi-player spinning reel type game. Otherwise, if the eligibility evaluator 833A determines that a gaming device 90A is eligible to participate in the multi-player game, the gaming device 90A prompts the player to make a player selection of one or more display positions at which selected symbols are to be modified. As indicated above, depending on the embodiment, the modification for a participating gaming device 90A may be based on a player selection received from either the same participating gaming device or another participating gaming device 90A.

At step 130, the player's selection of the display positions is received by the input device 58A of the gaming device 90A. At step 140, an event generator (or symbol generator) 835A implemented by the controller 80A selects a plurality of symbols based on random numbers generated by the RNG 834A implemented by the controller 80A, upon receiving a communication (via the respective communication interfaces 68A, 85A) from the gaming device 90A that received the player's selection of the display positions.

At step 150, an event modifier (or symbol modifier) 836A modifies, for each gaming device 90A of the gaming system 300 participating in the same multi-player game, the symbols selected by the event generator (or symbol generator) 835A at the display positions selected by each player at step 130. As indicated above, depending on the embodiment, the event modifier (or symbol modifier) 836A may be implemented by the controller 80 (which performs the modification for all participating gaming devices 90) or by each gaming device 90A (which performs the modification only in respect of the gaming device 90).

At step 160, the selected and modified symbols for each participating gaming device are displayed by the display 54A of the participating gaming device 90A. As indicated above, in an alternative embodiment, the gaming system 300 may include a plurality of multi-player game displays associated with respective ones of the gaming devices 90A of the gaming system 300A, and the selected and modified symbols may be displayed by these associated multi-player game displays (in addition to or as an alternative to the displays 54A of the gaming devices 90A).

At step 170, an event evaluator (or symbol evaluator) 838A evaluates, for each gaming device 90A of the gaming system 300 participating in the same multi-player game, the selected and modified symbols displayed at step 160 to determine whether or not the displayed symbols correspond to a winning symbol combination. As indicated above, depending on the embodiment, the event evaluator (or symbol evaluator) 838A may be implemented by the controller 80A (which performs the evaluation for all participating gaming devices 90A) or by each gaming device 90A (which performs the evaluation only in respect of the gaming device 90A).

At step 180, a prize awarder 839A implemented by the controller 80A makes awards to each of the participating gaming devices 90A. At step 190, the controller 80A determines, for each participating gaming device 90A, whether or not the multi-player game has ended. That is, the controller 80A determines, for each participating gaming device 90A, whether or not the gaming device 90A has completed all of the rounds of play the gaming device 90A is eligible to participate in. If the multi-player game has ended for a gaming device 90A, the controller 80A waits for another player input from the gaming device 90A to participate in a multi-player spinning reel type game. Otherwise, the event generator (or symbol generator) 835A selects another plurality of symbols for play of another round of the multi-player spinning reel type game. In various embodiments, the multi-player game can be played for multiple rounds without further input from players. That is, multiple rounds of the multi-player game may be played without any player interaction after a player inputs a wager and makes a player selection. However, it is envisaged that, in an alternative embodiment, players may be provided with an option to make new player selections after each round of play.

Figure 11:
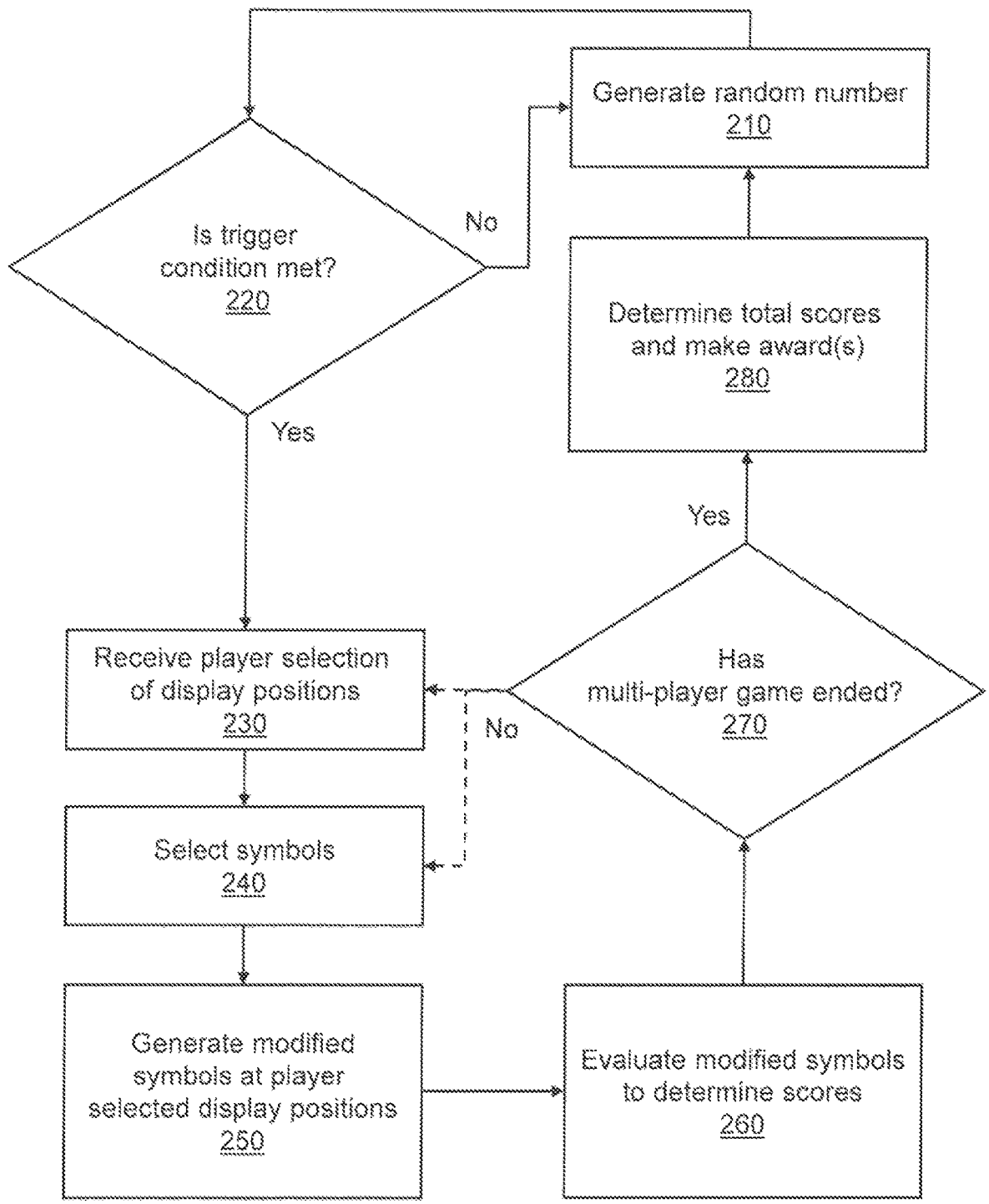
FIG. 11 is a flow chart of another method of gaming.

FIG. 11 is a flow chart of a method of gaming comprising a "tournament game mode" embodiment of the gaming system 300. At step 210, a RNG 834B implemented by the controller generates a random number (or pseudo-random number) at regular time intervals.

At step 220, a trigger monitor 831B implemented by the controller 80B monitors or constantly polls a trigger device in the form of the RNG 834B for determining whether or not a trigger condition met, specifically, whether or not the RNG 834B generates one of one or more predetermined numbers. If the trigger monitor 831B determines that the trigger condition is met (that is, that a random number generated by the RNG 834B is a predetermined number), a multi-player game is initiated by the controller 80B. In various embodiments, the multi-player game is a multi-player spinning reel type game.

At step 230, each participating gaming device 90B receives from the player of the gaming device 90B a player selection via the input device 58B of the gaming device 90B. In various embodiments, the player selection is one or more display positions of the multi-player spinning reel type game at which selected symbols are to be modified.

At step 240, upon receipt of a player selection from each participating gaming device an event generator (or symbol generator) 835B implemented by the controller 80B selects a plurality of symbols based on random numbers generated by the RNG 834B.

At step 250, an event modifier (or symbol modifier) 836B modifies, for each gaming device 90B of the gaming system 300 participating in the multi-player game, the symbols selected by the event generator (or symbol generator) 835B at the display positions selected by each player at step 230.

At step 260, the selected and modified symbols for each participating gaming device 90B are evaluated by an event evaluator (or symbol evaluator) 838B to determine an outcome in the form of a score.

As indicated above, depending on the embodiment, the event modifier 836B and the event evaluator 838B may be implemented by the controller 80B (which will perform symbol modification and the evaluation for all participating gaming devices 90B) or by each gaming device 90B.

At step 270, the controller 80B determines whether or not the multi-player spinning reel type game has ended, that is, whether all rounds of play of the multi-player game have been completed. If the controller 80B determines that not all rounds of play have been completed, another round of play of the multi-player game is initiated. As indicated above, depending on the embodiment, players at participating gaming devices 90B may or may not be permitted make player selections after each round of play of the multi-player game. In an embodiment where player selections after each round of play of the multi-player game are expected, each participating gaming device 90B again receives from the player of the gaming device 90B a player selection via the input device 58B of the gaming device 90B. In an alternative embodiment where player selections after each round of play of the multi-player game are not permitted, the event generator (or symbol generator) 835B implemented by the controller 80B selects another plurality of symbols based on random numbers generated by the RNG 834B for another round of play of the multi-player game.

If the controller 80B determines that all rounds of play have been completed, at step 280, a prize awarder 839B implemented by the controller 80B makes an award or awards to the winning gaming device or devices 90B. In various embodiments, the winning gaming device or devices 90B correspond to a predetermined number of the participating gaming devices 90B that achieve total scores that are higher than those achieved by the other participating gaming devices 90B. To determine the total score for each participating gaming device 90B, the prize awarder 839B adds up for each participating gaming device 90B, the scores gained in all rounds of play. To identify the winning gaming device or devices 90B, the prize awarder 839B compares the total scores of the participating gaming devices 90B and determines the predetermined number of the participating gaming devices 90B that achieve total scores that are higher than those achieved by the other participating gaming devices 90B.

Further aspects of the method will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art will appreciate that program code provides a series of instructions executable by the processor.

Figure 12A:
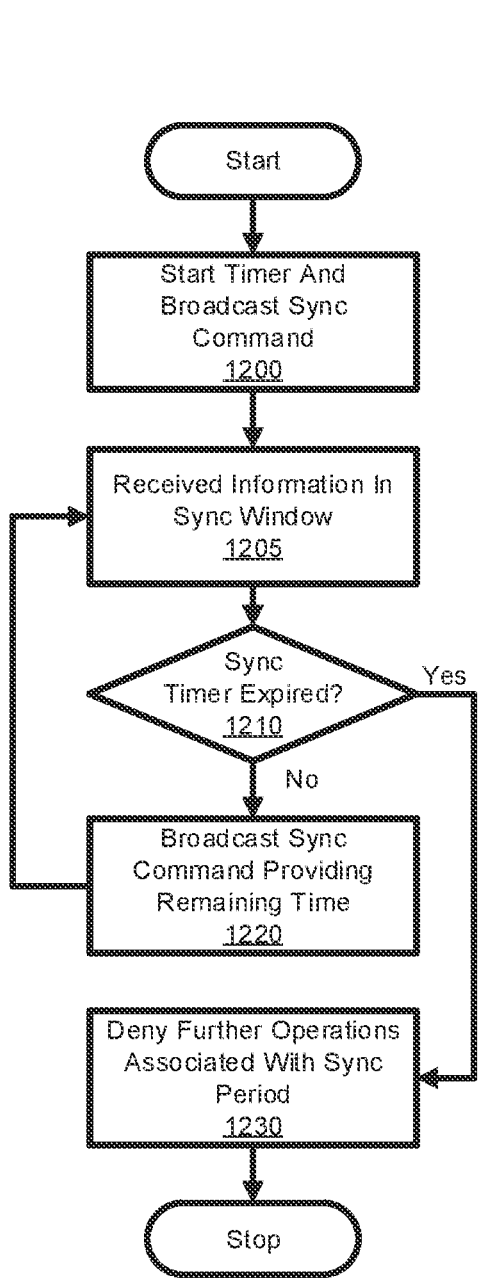
FIGS. 12A and 12B depict flow charts for a method of synchronizing gaming devices which are participating in a multi-player game.
Figure 12B:
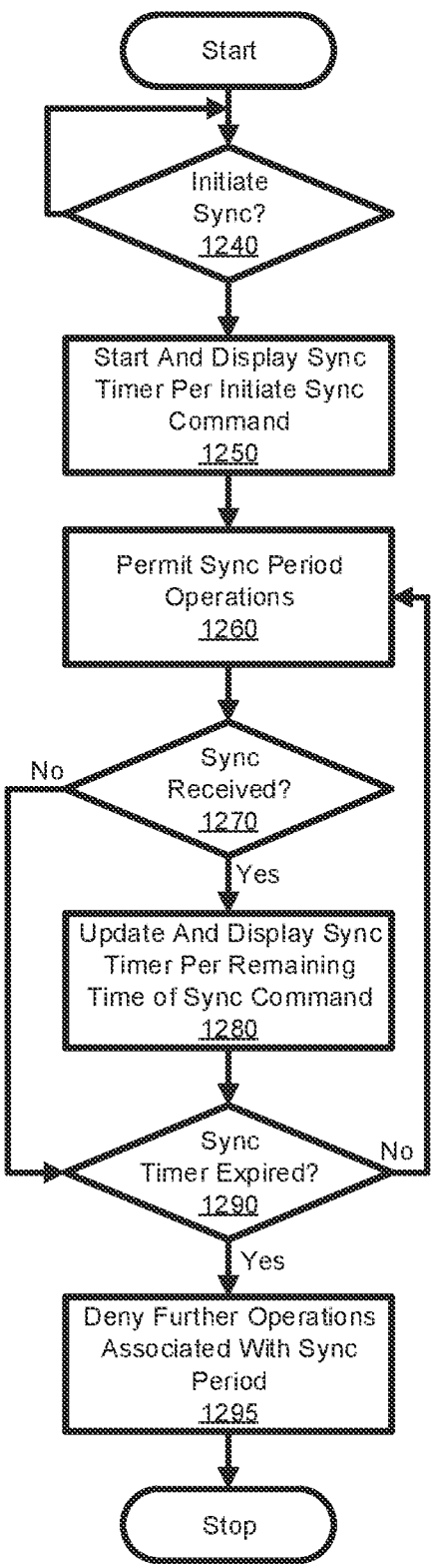

FIGS. 12A and 12B depict flow charts for a method of synchronizing gaming devices such as, for example, gaming devices 90A, 90B which are participating in a multi-player game. As should be appreciated, players participating in certain multi-player games may find it advantageous to wait for another player to make their selection so that they may see the game results of such selection before making their own selection. This is especially true if the multi-player game provides each player with the same symbols. In such embodiments, if left unchecked, a player may observe, via another participating gaming device 90A, 90B, symbols of an upcoming game display.

To combat such issues and ensure players are participating on an even playing field, the participating gaming devices 90A, 90B may be synchronized such that game play essentially proceeds in lock-step manner across the participating gaming devices 90A, 90B. To this end, the controllers 80A, 80B may coordinate or synchronize participating gaming devices 90A, 90B about important, critical, and/or other portions of game play. To this end, the controllers 80A, 80B may establish time periods or windows in which certain guarded operations (e.g., placing a wager, initiating a spin, selecting lines to play, selecting volatility, selecting display positions, and/or other game play dependent selections) may be made and accepted by the controller 80A, 80B and/or gaming devices 90A, 90B.

To this end, the controllers 80A, 80B may operate per the flow chart of FIG. 12A to establish time periods and/or windows for certain guarded operations. Moreover, the gaming devices 90A, 90B may operate per the flow chart of FIG. 12B to initiate time periods or windows specified by the controllers 80A, 80B and ensure that certain guarded operations occur within synchronized time periods the participating gaming devices 90A, 90B.

Referring now to FIG. 12A, a controller 80A, 80B may initiate or specify a sync period or window for one or more guarded operations (e.g., placing a wager, selecting lines to play, selecting volatility, selecting display positions, and/or other game play dependent selections.) To this end, the controller 80A, 80B at step 1200 may start a master sync timer or window and may send a sync command to one or more participating gaming devices 90A, 90B via its communication interface 85A, 85B. In various embodiments, the controller 80A, 80B and participating gaming devices 90A, 90B may be coupled via a closed network. As such, the controller 80A, 80B may generate a network broadcast message or otherwise broadcast the sync command to provide each of the participating gaming devices 90A, 90B with the sync command via a single networking message. In various embodiments, the controller 80A, 80B further starts a master timer with a certain expiration period (e.g., 30 seconds, 1 minute, 2 minutes, etc.). Moreover, the controller 80A, 80B may generate the sync command such that the sync command instructs recipients such as the participating gaming devise 90A, 90B to respectively start a sync timer with the same expiration period as the master sync timer. In this manner, the controller 80A, may open a sync window across the participating gaming devices 90A, 90B that will close upon expiration of the master timer.

At step 1205, the controller 80A, 80B may receive, from the participating gaming devices 90A, 90B, player selections and/or other information guarded by the sync window. After receiving such selections (or not), the controller 80A, 80B at step 1210 may determine whether the sync window has closed. In particular, the controller 80A, 80B may determine that the sync window has closed in response to expiration of the master sync timer. If the master sync timer has not expired, then the controller 80A, 80B at step 1220 may broadcast a sync update command that informs each of the participating gaming devices 90A, 90B how much time is remaining for the master sync timer. In various embodiments, the controller 80A, 80B may be configured to periodically send the sync update command at regular intervals (e.g., every 1 second, every 2 seconds, etc.). In some of these embodiments, each participating gaming device 90A, 90B may be configured to update the remaining time in the master sync time upon receipt of the sync update command and calculate a remaining time based on number of sync updates (or a remaining time or elapsed time communicated along with the sync update).

After the sync window has closed, the controller 80A, 80B at 1230 may control gaming devices 90A, 90B to deny further guarded operations (e.g., placing a wager, initiating a spin, selecting lines to play, selecting volatility, selecting display positions, and/or other game play dependent selections.) By denying such guarded operations, the controller 80A, 80B may prevent players from taking advantage of other players by observing their game results and basing their selection(s) and/or game play upon such observed results.

Referring to FIG. 12B, the gaming devices 90A, 90B may operate per the depicted flow chart to initiate time periods or windows specified by the controllers 80A, 80B and ensure that certain guarded operations are synchronized across the participating gaming devices 90A, 90B. To this end, a gaming devices 90A, 90B at step 1240 may determine whether to open a window for guarded operations. In particular, the gaming device 90A, 90B may determine to initiate a sync timer for a window based on a sync command received from the controller 80A, 80B. In response to the received sync command, the gaming device 90A, 90B at step 1250 may start and display the sync timer per an expiration period specified by the received sync command.

After starting the sync timer and opening a window for guarded operations, the gaming device 90A, 90B at step 1260 may accept, via its player interface 50A, 50B, guarded operations (e.g., placing a wager, initiating a spin, selecting lines to play, selecting volatility, selecting display positions, and/or other game play dependent selections) and inform the controller 80A, 90A of such received guarded operations.

At step 1270, the gaming device 90A, 90B may determine whether it needs to realign its sync timer with a corresponding sync timer of the controller 80A. 80B. In particular, the gaming device 90A, 90B, in response to receiving a sync update command from the controller 80A, 80B, may update at step 1280 its respective sync timer and graphical depiction on its display 54B based on the remaining time provided by the sync update command. In various embodiments, the controller 80A, 80B may be configured to send the sync update command at regular intervals (e.g., every 1 second, every 2 seconds, etc.). See, e.g., step 1220. In this manner, the sync timers of the participating gaming devices 90A, 90B may be kept in general synchronization with the master sync timer of the controller 80A, 80B.

At step 1290, the gaming device 90A, 90B may determine whether the sync window has closed. In particular, the gaming device 90A, 90B may determine that the sync window has closed in response to expiration of its sync timer. If the sync timer has not expired, then the gaming device 90A, 90B may permit further guarded operations at 1260. However, after the window has closed, the gaming device 90A, 90B at 1295 may deny further guarded operations. To this end, the gaming device 90A, 90B may disable aspects of its player interface 50A, 50B and provide visual feedback regarding its disable state (e.g., greying-out graphical controls displayed by its display 54A, 54B.) By denying such guarded operations, the gaming device 90A, 90B may prevent players from taking advantage of other players by observing their game results and basing their selection(s) and/or game play upon such observed results.

Figure 13:
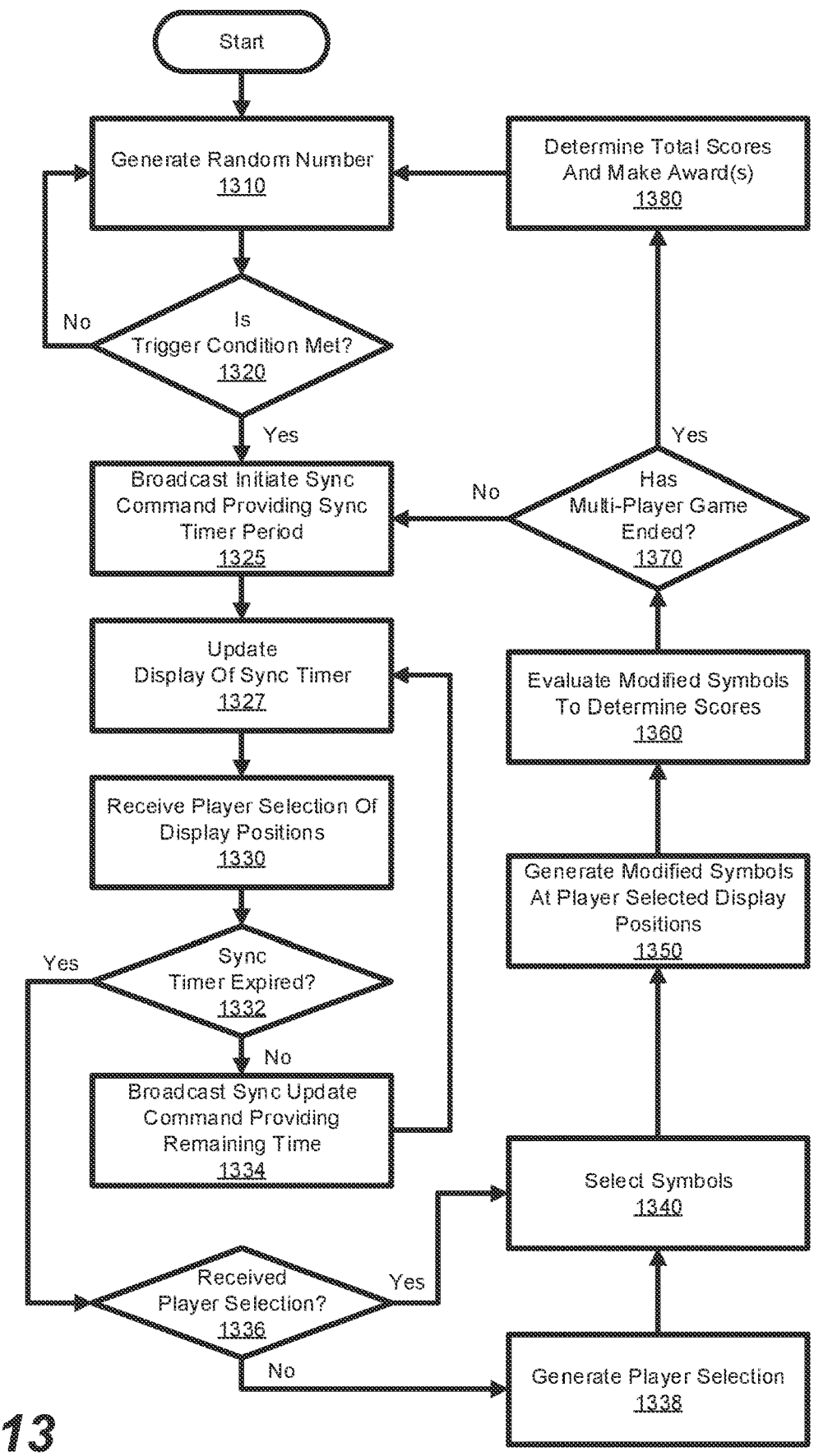
FIG. 13 is a flow chart of a method of gaming per tournament game mode, which further highlights synchronization aspects of FIGS. 12A and 12B.

FIG. 13 is a flow chart of a method of gaming per a "tournament game mode" embodiment of the gaming system 300 and further highlights synchronization aspects discussed above with regard to FIGS. 12A and 12B. At step 1310, the RNG 834B of the controller 80B may generate a random number (or pseudo-random number) at regular time intervals. In various embodiments, the RNG 834B may generate the random number due to the controller processor 83B executing a software module that implements the RNG 834B. In some embodiments, the RNG 834B may be implemented as a hardware module distinct from the controller processor 83B. Such a hardware module may generate random numbers and supply the generated random numbers to the controller processor 83B

At step 1320, a trigger monitor 831B implemented by the controller 80B may monitor or constantly poll a trigger device in the form of the RNG 834B for determining whether or not a trigger condition met, specifically, whether or not the RNG 834B generates one of one or more predetermined numbers. If the trigger monitor 831B determines that the trigger condition is met (that is, that a random number generated by the RNG 834B is a predetermined number), a multi-player game may be initiated by the controller 80B. In various embodiments, the multi-player game is a multi-player spinning reel type game. In various embodiments, the multi-player game is a multi-player bonus game that is initiated by one or more gaming devices (sending a trigger to trigger monitor 831B).

At step 1325, the controller 80B may broadcast a sync command which provides each participating gaming device 90B with a specified window in which the participating gaming devices 90B may accept player selections. In particular, the controller 80B may initiate a master sync timer and instruct the participating gaming devices 90B via the sync command to likewise initiate sync timers. For example, the controller 80B may start a master sync timer with a 1 minute expiration period or some other expiration period and may instruct each participating gaming device 90B to start a sync timer that coincides with the master sync timer of the controller 80B. Besides initiating sync timers, the sync command may further instruct participating gaming devices 90B to accept player selections for display positions and forward such selections to the controller 80B during the 1 minute window specified by the sync timer. In some embodiments, the sync command may not instruct the participating gaming device 90B to accept and forward player selections, but instead the participating gaming devices 90B may be programmed or otherwise configured to accept and forward such player selections during the sync window specified by the sync timer.

At step 1327, each participating gaming device 90B may update via its display 54B a graphical depiction of its sync timer counting down. Moreover, each participating gaming device may prompt the player via its display 54B to select a display position before the displayed timer expires. In this manner, each participating gaming device 90B may provide its player with suitable feedback regarding actions to take and by when such actions are to be completed.

At step 1330, each participating gaming device 90B may receive from the player of the gaming device 90B a player selection via the input device 58B of the gaming device 90B. In various embodiments, the player selection may comprise one or more display positions of the multi-player spinning reel type game at which selected symbols are to be modified.

At step 1332, each participating gaming device 90B and the controller 80A may determine whether the sync window for receiving player selections has closed. In particular, each participating gaming device 90B and the controller 80A may determine wither its respective sync timer has expired. If they have expired, then the selection window has closed and the participating gaming devices 90B and the controller 80A may proceed with the tournament mode game. Otherwise, the controller 80A at step 1334 may broadcast a sync update command that informs each of the participating gaming devices 90B how much time is remaining on the sync timer for the controller 80A. In response to the sync update command, each participating gaming device 90B at step 1327 may update its respective sync timer and graphical depiction on its display 54B based on the remaining time provided by the sync update command. In various embodiments, the controller 80A may be configured to send the sync update command at regular intervals (e.g., every 1 second, every 2 seconds, etc.). In this manner, the sync timers of the participating gaming devices 90B may be kept in general synchronization with the sync timer of the controller 80A.

After the window has closed, the controller 80A at 1336 may determine whether a player selection was received for each participating gaming device 90B before the sync timer expired. If a player at a participating gaming device 90B failed to provide a selection within the window, then the controller 80A at 1338 may make a selection on behalf of the player. For example, the controller 80A may randomly select a display position for the player. In various embodiments, the controller 80A may select a display position for a player based on other criteria such as whether a particular display position has been selected by another player.

At step 1340, upon receipt of a player selection from each participating gaming device an event generator (or symbol generator) 835B implemented by the controller 80B may select a plurality of symbols based on random numbers generated by the RNG 834B.

At step 1350, an event modifier (or symbol modifier) 836B may modify, for each gaming device 90B of the gaming system 300 participating in the multi-player game, the symbols selected by the event generator (or symbol generator) 835B at the display positions selected by each player at step 1330.

At step 1360, the selected and modified symbols for each participating gaming device may be evaluated by an event evaluator (or symbol evaluator) 838B to determine an outcome in the form of a score.

As indicated above, depending on the embodiment, the event modifier 836B and the event evaluator 838B may be implemented by the controller 80B (which will perform symbol modification and the evaluation for all participating gaming devices 90B) or by each gaming device 90B.

At step 1370, the controller 80B may determine whether or not the multi-player spinning reel type game has ended, that is, whether all rounds of play of the multi-player game have been completed. If the controller 80B determines that not all rounds of play have been completed, another round of play of the multi-player game may be initiated. As indicated above, depending on the embodiment, players at participating gaming devices 90B may or may not be permitted to make player selections after each round of play of the multi-player game. In an embodiment where player selections after each round of play of the multi-player game are expected, each participating gaming device 90B may again receive sync commands and sync update commands from the controller 80B that specify a window in which player selections may be accepted by the participating gaming devices 90B. In various embodiments, where player selections after each round of play of the multi-player game are not permitted, the event generator (or symbol generator) 835B implemented by the controller 80B may select another plurality of symbols based on random numbers generated by the RNG 834B for another round of play of the multi-player game.

If the controller 80B determines that all rounds of play have been completed, at step 1380, a prize awarder 839B implemented by the controller 80B may make an award or awards to the winning gaming device or devices 90B. In various embodiments, the winning gaming device or devices 90B may correspond to a predetermined number of the participating gaming devices 90B that achieve total scores that are higher than those achieved by the other participating gaming devices 90B. To determine the total score for each participating gaming device 90B, the prize awarder 839B may add up for each participating gaming device 90B, the scores gained in all rounds of play. To identify the winning gaming device or devices 90B, the prize awarder 839B may compare the total scores of the participating gaming devices 90B and may determine the predetermined number of the participating gaming devices 90B that achieve total scores that are higher than those achieved by the other participating gaming devices 90B.

Further aspects of the method will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art will appreciate that program code provides a series of instructions executable by the processor.

It will be understood to persons skilled in the art of the invention that many modifications may be made without departing from the spirit and scope of the invention. In particular, it will be apparent that certain features of embodiments of the invention can be employed to form further embodiments. For example, the controller 80 is shown in FIG. 1 as a separate entity to the gaming devices 90. In an alternative embodiment, the controller 80 could be part of one of the gaming devices 90, for example, in the form of a server module arranged to implement the controller 80 in the manner described in Australian patent application 2008205413 filed 13 Aug. 2008.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

What is claimed is:

1. A gaming system, comprising:
    a controller;
    a plurality of gaming devices coupled to the controller and configured to participate in a multi-player game comprising a plurality of rounds, each gaming device comprising a player interface, a processor, a memory, and a display device, wherein each gaming device stores instructions, which when executed by the processor of the gaming device, cause the gaming device to:
        initiate a sync timer in response to a sync command received from the controller;
        receive, via its respective player interface, a selection of at least one display position from a plurality of display positions for its respective display device;
        accept the selection of the at least one display position if its respective sync timer has not expired;
        for each round of the plurality of rounds,
            display on its respective display device a respective modified game outcome, the respective modified game outcome corresponding to a respective initial game outcome that is modified based on the selection of the at least one display position received from its respective player interface; and
            update a respective score based on its respective modified game outcome; and
            transmit a total score of the plurality of rounds to the controller; and
    wherein the controller is configured to execute instructions stored in a memory, the instructions when executed, cause the controller to at least send the sync command to the plurality of gaming devices and identify a winning gaming device of the plurality of gaming devices based on the respective scores of the plurality of gaming devices.

2. The gaming system of claim 1, wherein the sync command comprises an expiration period for the respective sync timers of the plurality of gaming devices.

3. The gaming system of claim 1, wherein execution of the instructions causes the controller to initiate a master sync timer and send a sync update command comprising time remaining before expiration of the master sync timer.

4. The gaming system of claim 3, wherein each gaming device is configured to receive the sync update command and update its respective sync timer based on the time remaining provided by the received sync update command.

5. The gaming system of claim 1, wherein the instructions cause the controller to generate the respective initial game outcome for each gaming device.

6. The gaming system of claim 5, wherein the instructions cause the controller to generate the respective modified game outcome displayed by each gaming device based on the selection of the at least one display position received from each respective player interface.

7. The gaming system of claim 5, wherein each gaming device is configured to generate its respective modified game outcome based on the selection of the at least one display position received via its respective player interface.

8. The gaming system of claim 1, wherein each gaming device is configured to generate its respective initial game outcome.

9. The gaming system of claim 8, wherein each gaming device is configured to generate its respective modified game outcome based on the selection of the at least one display position received via its respective player interface.

10. The gaming system of claim 1, wherein each gaming device is configured to generate its respective modified game outcome by replacing symbols at each display position of the selection of the at least one display position with a function symbol.

11. A method of gaming per a multi-player game having a plurality of rounds, the method comprising:
    broadcasting a sync command from a controller to a plurality of gaming devices;
    opening, a respective window for each gaming device from the plurality of gaming devices, in response to receiving the sync command from the controller; and
    receiving, via a respective player interface of each gaming device during its respective open window, a selection of at least one display position from a plurality display positions for a respective display device of each gaming device; and
    for each round of the plurality of rounds,
        displaying, at each gaming device, a respective modified game outcome, the respective modified game outcome corresponding to an initial game outcome for the respective gaming device that is modified based on the selection of the at least one display position received for the respective gaming device; and
        updating, at each gaming device, a respective score based on its respective modified game outcome;
        transmitting a respective score for each gaming device to the controller; and
        identifying, with the controller coupled to the plurality of gaming devices, a winning gaming device of the plurality of gaming devices based on the respective scores of the plurality of gaming devices.

12. The method of claim 11, comprising each gaming device setting an expiration period of its respective window based on an expiration period provided by the received sync command.

13. The method of claim 11, comprising:
    opening a window for the controller; and
    periodically broadcasting, from the controller, a sync update command comprising timing remaining for the window of the controller.

14. The method of claim 13, comprising:
    receiving, with each gaming device, the sync update command; and
    updating the respective window of each gaming device based on the time remaining provided by the received sync update command.

15. The method of claim 11, comprising, generating, with controller, the respective initial game outcome for each gaming device.

16. The method of claim 15, comprising, generating, with the controller, the respective modified game outcome displayed by each gaming device based on the selection of display positions received from each respective player interface.

17. A non-transitory computer readable storage medium comprising instructions that when executed, cause a gaming device to:
  receive a sync command from a controller;
  open a window in response to receiving the sync command from the controller; and
  receive, via a player interface of the gaming device, a selection of at least one display position from a plurality display positions of the gaming device;
  accept the selection of the at least one display position if the selection is received within the open window; and
  for each round of a plurality of rounds,
    display a modified game outcome corresponding to an initial game outcome that is modified based on the selection of the at least one display position; and
    update a respective score based on the modified game outcome;
    transmit the respective score to the controller; and
    indicate a winning gaming device of the plurality of gaming devices.

18. The non-transitory computer readable storage medium of claim 17, wherein execution of the instructions causes the gaming device to set an expiration period for the window per an expiration period specified by the received sync command.

19. The non-transitory computer readable storage medium of claim 18, wherein execution of the instructions causes the gaming device to update the expiration period of the window based on time remaining provided by a received sync update command.

20. The non-transitory computer readable storage medium of claim 17, wherein execution of the instructions causes the gaming device to generate its modified game outcome by replacing a symbol at the selected display position with a function symbol.

* * * * *